United States Patent
Matsunaga et al.

(10) Patent No.: US 11,535,203 B2
(45) Date of Patent: Dec. 27, 2022

(54) AIR CLEANER FOR VEHICLES

(71) Applicant: KOITO MANUFACTURING CO., LTD., Tokyo (JP)

(72) Inventors: Takahiro Matsunaga, Shizuoka (JP); Akinobu Kubota, Shizuoka (JP); Yasuhiro Ichikawa, Shizuoka (JP)

(73) Assignee: KOITO MANUFACTURING CO.. LTD., Tokyo ( * ) Notice: Subject to any disclaimer, the term of this patent is extended or adjusted under 35 U.S.C. 154(b) by 336 days.

(21) Appl. No.: 16/640,779

(22) PCT Filed: Aug. 6, 2018

(86) PCT No.: PCT/JP2018/029433
§ 371 (c)(1),
(2) Date: Feb. 21, 2020

(87) PCT Pub. No.: WO2019/044399
PCT Pub. Date: Mar. 7, 2019

(65) Prior Publication Data
US 2021/0031729 A1 Feb. 4, 2021

(30) Foreign Application Priority Data

Aug. 30, 2017 (JP) .............................. JP2017-165446
Aug. 30, 2017 (JP) .............................. JP2017-165448
(Continued)

(51) Int. Cl.
*B60S 1/56* (2006.01)
*B60S 1/54* (2006.01)
(Continued)

(52) U.S. Cl.
CPC . *B60S 1/56* (2013.01); *B60S 1/54* (2013.01); *F04D 25/06* (2013.01); *F04D 29/281* (2013.01)

(58) Field of Classification Search
CPC .... B60S 3/00; B60S 1/60; B60S 1/566; B60R 1/00; B60R 11/04; B60R 2011/004;
(Continued)

(56) References Cited

U.S. PATENT DOCUMENTS

| 5,953,158 A | 9/1999 | Kamakura et al. |
| 9,625,714 B2 * | 4/2017 | Rousseau ................. B60S 1/52 |
| 2018/0186342 A1 | 7/2018 | Kubota et al. |

FOREIGN PATENT DOCUMENTS

| DE | 10 2010 025 758 A1 | 1/2012 |
| EP | 3 508 387 A1 | 7/2019 |

(Continued)

OTHER PUBLICATIONS

Partial Supplementary European Search Report dated Apr. 16, 2021, issued by the European Patent Office in counterpart European patent Application No. 18851958.1.
(Continued)

*Primary Examiner* — Katina N. Henson
(74) *Attorney, Agent, or Firm* — Sughrue Mion, PLLC

(57) ABSTRACT

Provided is an air cleaner for vehicles, configured so that objects to be cleaned can be easily maintained in as clean state. This fair cleaner (1) for vehicles is provided with: ejection openings (20, 30) for ejecting air toward the surfaces (21, 31) to be cleaned of objects (2, 3) to be cleaned and a non-positive displacement blower means (10) for continuously delivering air to the ejection openings (20, 30).

4 Claims, 17 Drawing Sheets

(30) Foreign Application Priority Data

Dec. 28, 2017 (JP) .............................. JP2017-254182
Mar. 19, 2018 (JP) .............................. JP2018-051385

(51) Int. Cl.
*F04D 25/06* (2006.01)
*F04D 29/28* (2006.01)

(58) Field of Classification Search
CPC ..... B60R 2011/0082; B60R 2011/0085; B08B 1/001; B08B 3/08; G02B 27/0006
USPC ........................................................ 15/313
See application file for complete search history.

(56) References Cited

FOREIGN PATENT DOCUMENTS

| FR | 3 027 006 | A1 | | 4/2016 |
|----|-----------|----|----|--------|
| JP | 6-65126 | U | | 9/1994 |
| JP | 9-277911 | A | | 10/1997 |
| JP | 10-324225 | A | | 12/1998 |
| JP | 11-78800 | A | | 3/1999 |
| JP | 2001-171491 | A | | 6/2001 |
| JP | 2013-6481 | A | | 1/2013 |
| JP | 2016018203 | A | * | 2/2016 |
| WO | 2017/002878 | A1 | | 1/2017 |
| WO | 2018/043743 | A1 | | 3/2018 |

OTHER PUBLICATIONS

International Search Report dated Sep. 18, 2018 issued by the International Searching Authority in counterpart International Application No. PCT/JP2018/029433 (PCT/ISA/210).

Written Opinion dated Sep. 18, 2018 issued by the International Searching Authority in counterpart International Application No. PCT/JP2018/029433 (PCT/ISA/237).

* cited by examiner

AIR CLEANER FOR VEHICLES

TECHNICAL FIELD

The present disclosure relates to a vehicle air cleaner.

BACKGROUND ART

In recent years, an increasing number of vehicles are provided with an vehicle-mounted camera that images the situation around the vehicle. In the vehicle-mounted camera, a lens that is an imaging surface may become dirty due to rain, mud or the like. For this reason, in order to remove foreign matters such as water droplets adhering to the lens, there is known an apparatus for removing foreign matters by blowing a cleaning liquid, compressed air, or the like on the lens of the vehicle-mounted camera.

For example, Patent Literature 1 proposed a structure in which a compressed air generating unit is provided in the vicinity of an vehicle-mounted camera, and compressed air from the compressed air generating unit is ejected from a nozzle so that high-pressure air is blown onto a front glass of the vehicle-mounted camera to remove water droplets attached to the front glass.

Further, Patent Literature 1 disclosed a vehicle air cleaner that blows air sent out from single air blower to a plurality of objects to be cleaned.

CITATION LIST

Patent Literature

Patent Literature 1: JP-A-2001-171491

However, the vehicle air cleaner includes electronic components. Therefore, when mounting the vehicle air cleaner on a vehicle, it is necessary to prevent the electronic components from getting wet. However, if the entire vehicle air cleaner is made waterproof, a size of the vehicle air cleaner itself or an internal space of the vehicle in which the vehicle air cleaner is housed skill be increased.

The present inventor has found that, simply by arranging the air blower and the plurality of nozzles as described in Patent Literature 1, a flow rate of air blown from the nozzle is not uniform, and it is difficult to effectively clean all objects to be cleaned.

SUMMARY OF INVENTION

Technical Problem

An object of the present disclosure is to provide a vehicle air cleaner that, can easily maintain an object to be cleaned in a clean state.

Another object of the present disclosure is to provide a vehicle air cleaner which is compact while electronic components are waterproofed.

Still another object of the present disclosure is to provide a vehicle air cleaner in which a flow rate of air flowing out from a plurality of nozzles can be easily controlled.

Solution to Problem

A vehicle air cleaner according to an aspect of the present disclosure is a vehicle air cleaner for cleaning an object to be cleaned, the vehicle air cleaner includes:
- an ejection port configured to eject air toward a clean surface of the object to be cleaned; and
- a non-positive displacement air blower that continuously sends air to the ejection port.

According to the vehicle air cleaner of one aspect of the present disclosure, the object to be cleaned can be easily maintained in a clean state.

A vehicle air cleaner according to another aspect of the present disclosure is a vehicle air cleaner which includes:
- a plurality of nozzles configured to blow air onto an object to be cleaned;
- a single non-positive displacement air blower configured to send air to the nozzles; and
- a single flow rate adjustment chamber that is provided in a pipe line between the non-positive displacement air blower and the nozzles, and configured to adjust a flow rate of air coming out of the nozzles.

According to the vehicle air cleaner of another aspect of the present disclosure, the flow rate of air flowing out from the plurality of nozzles can be easily controlled.

A vehicle air cleaner according to still another aspect of the present disclosure is a vehicle air cleaner to be attached to a vehicle appearance component having an opening via a waterproof member, the vehicle air cleaner includes:
- the waterproof member;
- an air blowing mechanism configured to send out air to be ejected to an object to be cleaned; and
- a motor configured to drive the air blowing mechanism,
  in which the motor is disposed in an area that is waterproofed by the waterproof member and the vehicle appearance component, and
  in which the air blowing mechanism is disposed in an area that is not waterproofed by the waterproof member and the vehicle appearance component.

According to another aspect of the present disclosure, the vehicle air cleaner can be compact while the electronic component is waterproofed.

DESCRIPTION OF EMBODIMENTS

First Embodiment

Figure 1:
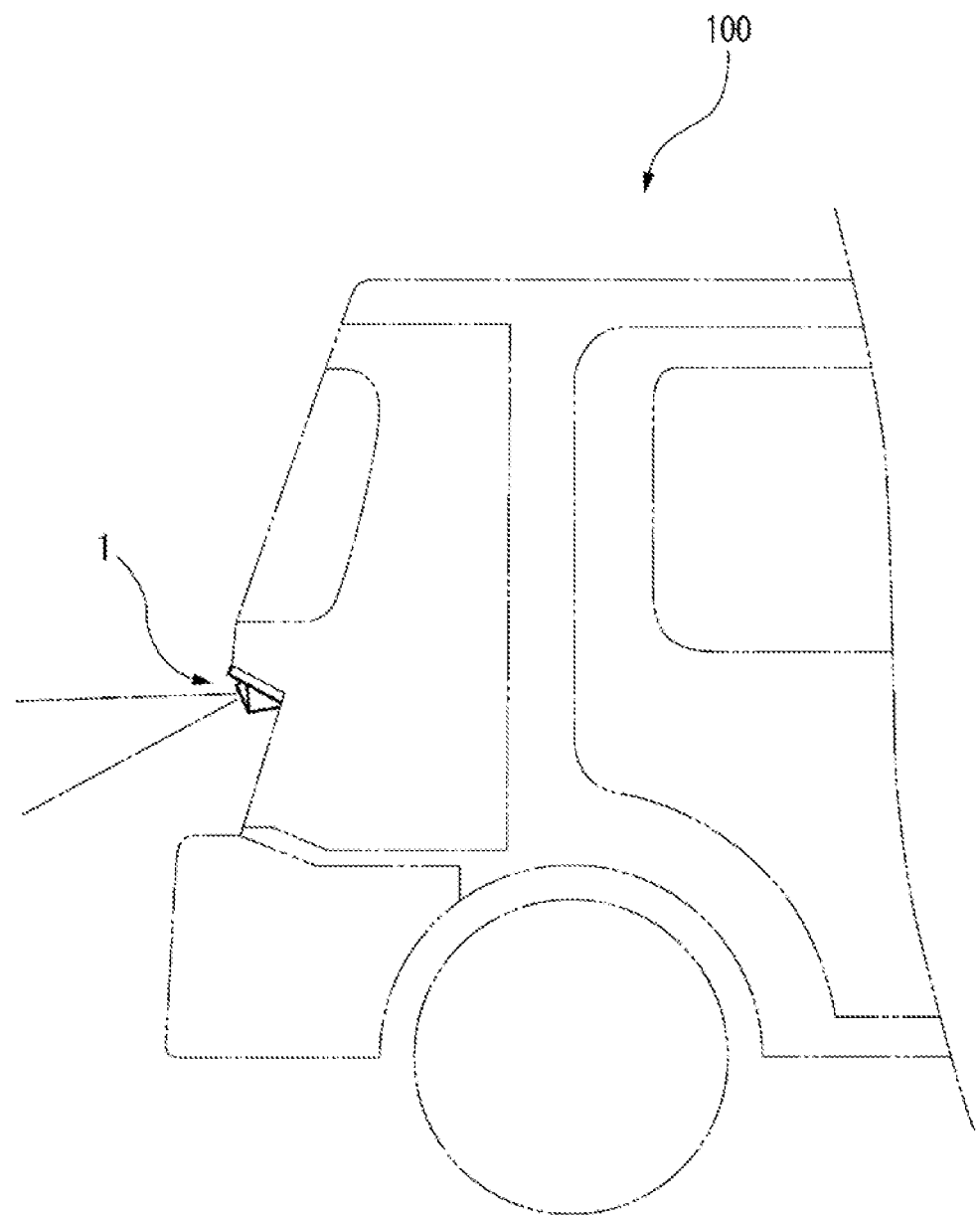
FIG. 1 is a schematic view showing a vehicle to which a vehicle air cleaner is attached.

A vehicle air cleaner 1 according to a first embodiment will be described with reference to the drawings. FIG. 1 is a schematic view showing a vehicle 100 to which the vehicle air cleaner 1 is attached. As shown in FIG. 1, the vehicle air cleaner 1 is provided at a rear portion of the vehicle 100.

Figure 2:
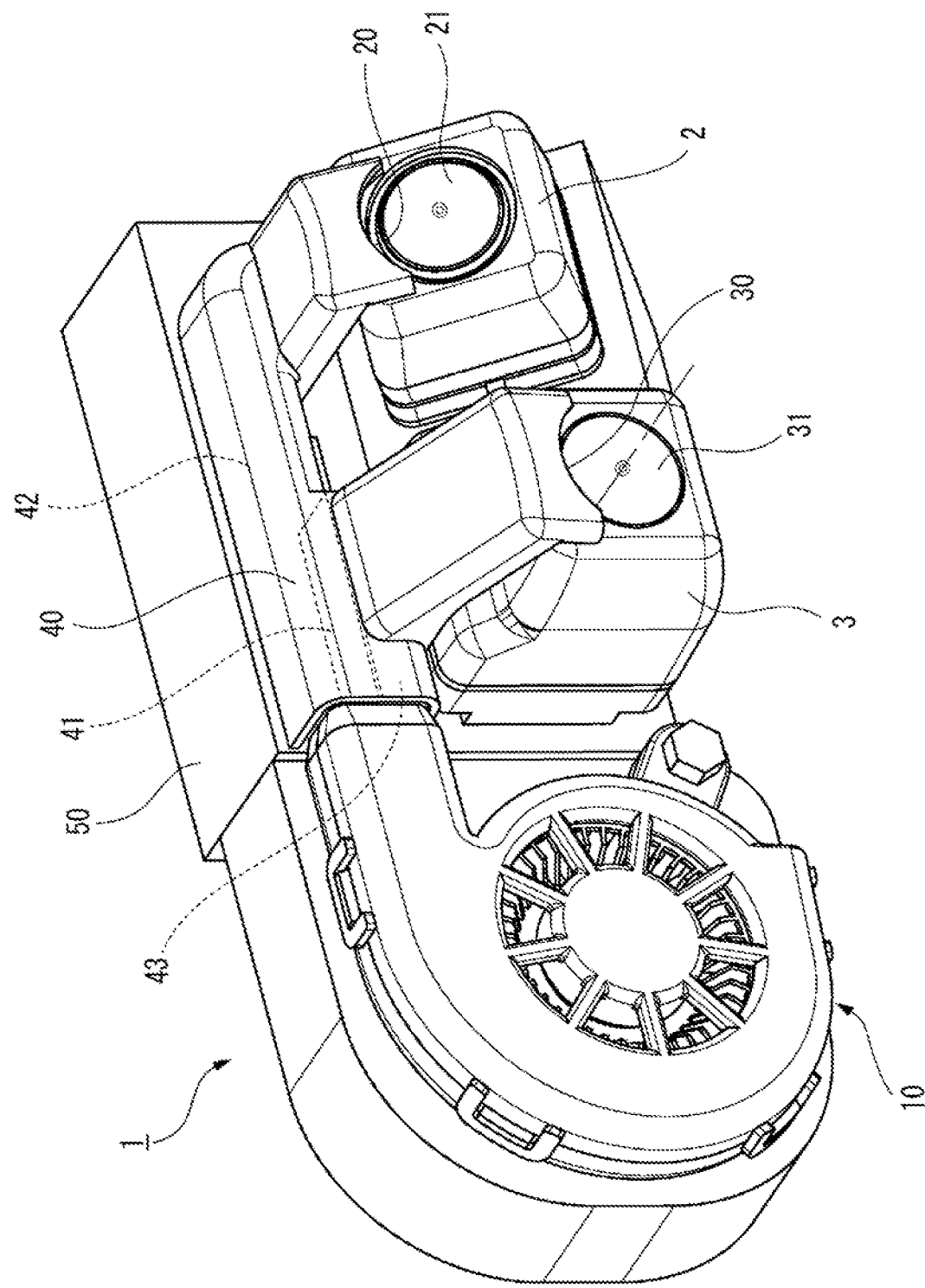
FIG. 2 is a perspective view of the vehicle air cleaner according to a first embodiment.

FIG. 2 is a perspective view of the vehicle air cleaner 1. As shown in FIG. 2, the vehicle air cleaner 1 is integrated with a rear camera 2 and a back camera 3. The vehicle air cleaner 1 blows air to the rear camera 2 and the back camera 3.

The rear camera 2 always acquires an image behind the vehicle 100. The rear camera 2 always acquires an image behind the vehicle 100 with a relatively wide angle of view. For example, information output from the rear camera 2 can be used to confirm the presence or absence of another vehicle that is about to pass the own vehicle from behind.

The back camera 3 acquires an image of a rear side of the vehicle 100 when the vehicle 100 moves rearward. The back camera 3 acquires information in the vicinity of the own vehicle when the vehicle is moving rearward. For example, information output from the back camera 3 can be used to confirm the presence of an obstacle near the own vehicle during parking or the like.

The vehicle air cleaner 1 includes a multi-blade fan 10 as a non-positive displacement air blower, an air guide path 40, a rear ejection port 20, a back ejection port 30, and a base frame 50 that supports them. The rear camera 2 and the back camera 3 are also attached to the base frame 50.

The rear ejection port 20 ejects air onto a lens 21 (clean surface) of the rear camera 2. The rear ejection port 20 is provided above the lens 21 of the rear camera 2. The back ejection port 30 ejects air onto a lens 31 (clean surface) of the back camera 3. The back ejection port 30 is provided above the lens 31 of the back camera 3. The air guide path 40 guides the air sent from the multi-blade fan 10 to the rear ejection port 20 and the back ejection port 30.

A partition wall 41 extending in a longitudinal direction is provided inside the air guide path 40. The interior of the air guide path 40 is partitioned by the partition wall 41 to form two flow paths. In the air guide path 40, a flow path 42 from the multi-blade fan 10 to the rear ejection port 20, and a flow path 43 from the multi-blade fan 10 to the back ejection port 30 are independent.

Figure 3:
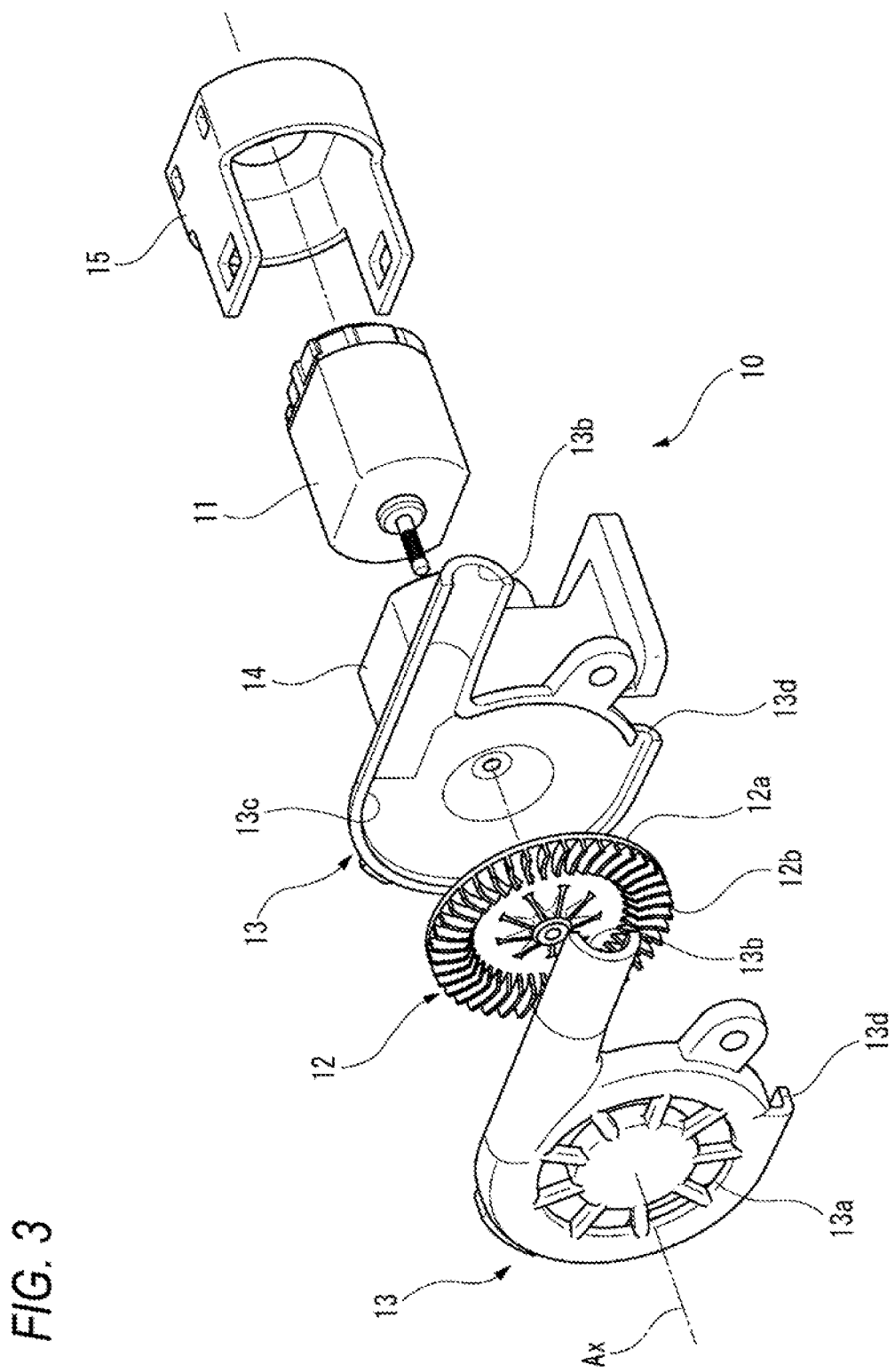
FIG. 3 is an exploded perspective view of a multi-blade fan.

FIG. 3 is an exploded perspective view of the multi-blade fan 10. As shown in FIG. 3, the multi-blade fan 10 includes a motor 11, an impeller 12, a housing 13, a frame 14, and a motor case 15. The impeller 12 can be rotated around a rotation axis Ax by the motor 11. The impeller 12 has a disk-shaped main plate 12a and a plurality of blades 12b. The plurality of blades 12b are formed so as to extend in a radial direction. The plurality of blades 12b are attached to the main plate 12a so as to form an annular shape.

The housing 13 covers the impeller 12. The housing 13 is divided into two so as to sandwich the impeller 12. The housing 13 has a suction port 13a and a blowout port 13b. The suction port 13a opens on an extension line of the rotation axis Ax of the impeller 12. The blowout port 13b opens in a direction intersecting with the rotation axis Ax of the impeller 12.

The housing 13 has a substantially donut-shaped internal space therein. The impeller 12 is accommodated in the internal space. When the impeller 12 rotates, the air sucked in from the suction port 13a is pressed against an inner peripheral surface 13c of the housing 13 by the blades 12b. The pressed air is guided along the inner peripheral surface 13c of the housing 13 to the blowout port 13b, and sent out from the blowout port 13b to the air guide path 40. That is, the air sucked in from the direction of the rotational axis Ax of the impeller 12 is pushed out in the radial direction by the rotating blades 12b, pressed against the inner peripheral surface 13c of the housing 13, and sent out to the air guide path 40 from the blowout port 13b opened in the radial direction.

The housing 13 further has a drain hole 13d. The drain hole 13d allows the internal space to communicate with the outside. The drain hole 13d opens at a bottom portion of the housing 13 in a state where the vehicle air cleaner is attached to the vehicle 100. The water that has entered the inside of the housing 13 falls to the outside through the drain hole 13d, so that the water does not accumulate inside the housing 13.

The multi-blade fan 10 in the vehicle air cleaner 1 according to the present embodiment includes:
the motor 11;
the impeller 12 that includes the plurality of blades 12b Which are attached in an annular shape, and is rotated around the rotation axis Ax by the motor 11; and
the housing 13 that covers the impeller 12, and includes the suction port 13a opened in the direction of the rotation axis Ax and the blowout port 13b opened in a direction intersecting the rotation axis Ax.

Therefore, the vehicle air cleaner 1 includes the multi-blade fan 10 as a non-positive displacement air blower, so that a relatively large air volume and air pressure is easily ensured. A sirocco fan, a turbo fan, a propeller fan or the like may be adopted as the multi-blade fan 10.

Incidentally, the vehicle air cleaner of Patent Literature 1 operates when an ON signal is input to the cleaner. For this reason, the vehicle air cleaner as disclosed in Patent Literature 1 is configured to operate based on a detection signal of dirt on an object to be cleaned, or based on a user's operation. However, a vehicle sensor used for automatic driving such as a camera or LiDAR is preferably to be not attached with dirt in the first place.

According to the vehicle air cleaner 1 of the present embodiment, air is continuously blown onto the object to be cleaned by the non-positive displacement air blower 10, so that a layer of air (air curtain) flowing on the surface of the object to be cleaned is formed. As a result, slight dirt is flowed to the outside before adhering to the object to be cleaned by the layer of flowing air, and the dirt is hardly attached to the object to be cleaned in the first place.

Further, according to the vehicle air cleaner 1 of the present embodiment, the air is continuously blown onto the object to be cleaned by the non-positive displacement air blower 10, so that dirt is immediately removed even if the dirt adheres to the object to be cleaned. At this time, as long as the vehicle air cleaner 1 is energized, the air is always blown onto the object to be cleaned. Therefore, there is no need to, provide a dirt sensor, a user operation unit, or a control unit for operating the multi-blade fan 10 in accordance with an output signal from these, and the vehicle air cleaner 1 can be mounted on the vehicle 100 at a low cost.

Second Embodiment

In the first embodiment, the continuation using the multi-blade fan 10 as the non-positive displacement air blowing mechanism has been described, but the present invention is not limited thereto. A diagonal flow fan 60 as shown in FIGS. 4 and 5 may also be used as the non-positive displacement air blowing mechanism.

Figure 4:
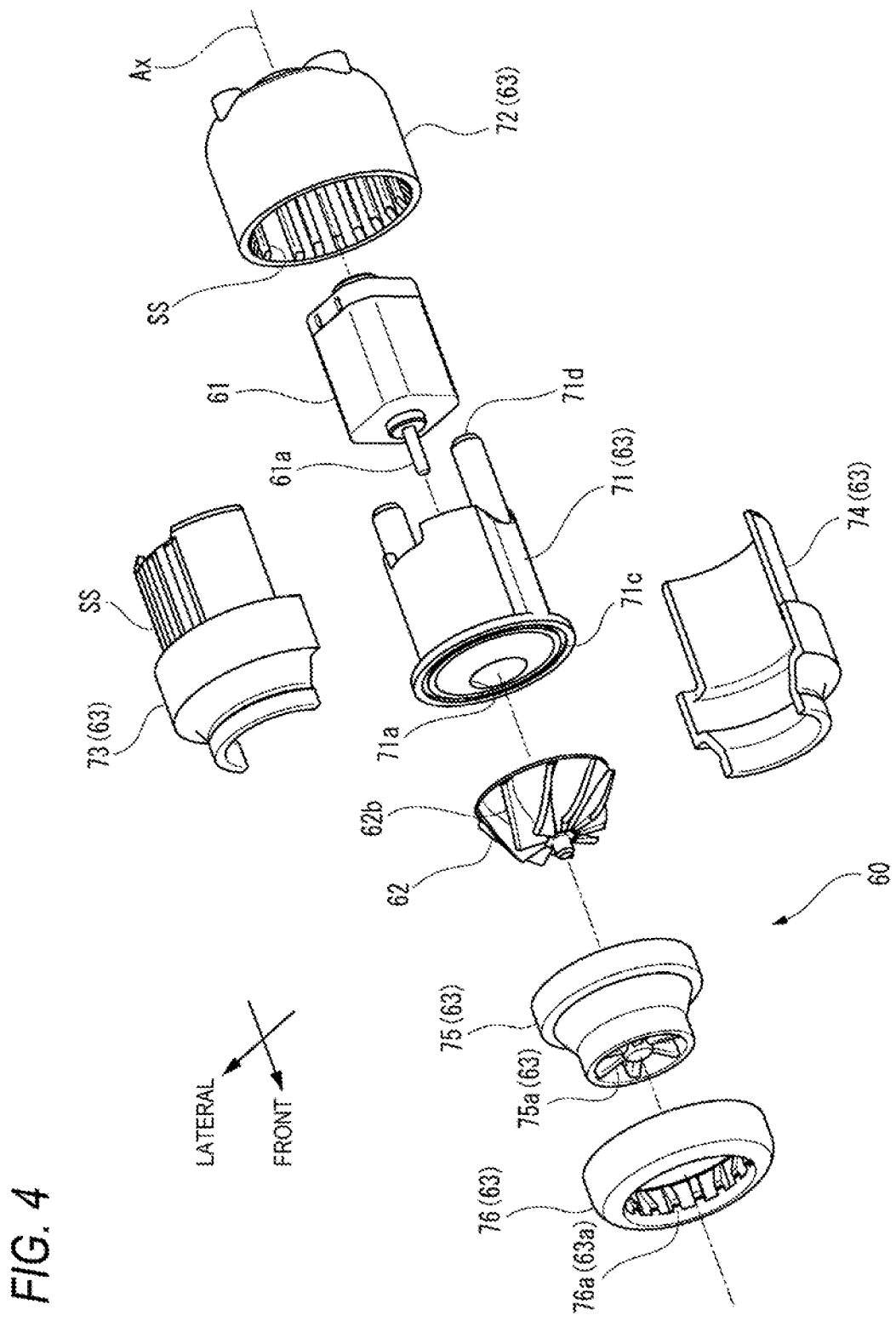
FIG. 4 is an exploded perspective view of a diagonal flow fan.
Figure 5:
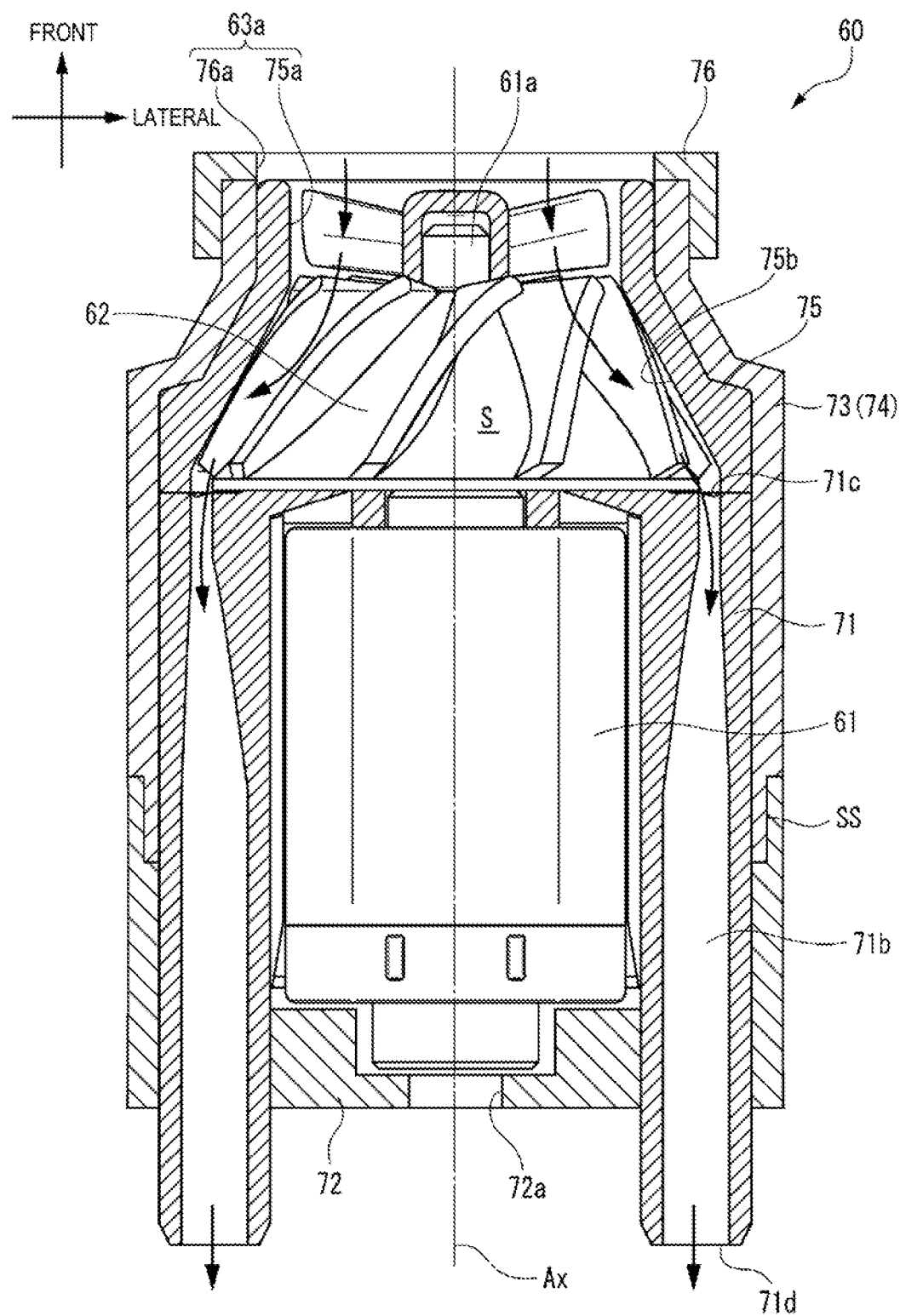
FIG. 5 is a sectional view of the diagonal flow fan.

FIG. 4 is an exploded perspective view of the diagonal flow fan 60. FIG. 5 is a sectional view of the diagonal flow fan 60. As shown in FIGS. 4 and 5, the diagonal flow fan 60 includes a motor 61, a rotor 62, and a housing 63. In the following description, for the sake of convenience, a direction in which a rotation shaft 61a of the motor 61 protrudes in the direction of a rotation axis Ax of the motor 61 is referred to as the front side, and the opposite direction is referred to as the rear side.

The rotor 62 is a conical member with a plurality of blades 62b which are attached in an annular shape on an outer peripheral surface thereof. The rotor 62 is rotated around the rotation axis Ax by the motor 61. The motor 61 is provided at a position where it contacts a bottom surface of the conical rotor 62. The rotation axis Ax of the motor 61 is coincident with a generatrix of the conical rotor 62. The rotation shaft 61a of the motor 61 is coupled to the rotor 62. The rotor 62 rotates as the motor 61 rotates.

The housing 63 includes a first motor case 71, a second motor case 72, a first outer case 73, a second outer case 74, a front case 75, and a cap 76. The first motor case 71 and the second motor case 72 are cylindrical members. The first motor case 71 and the second motor case 72 cover the motor 61. The first motor case 71 is attached to the motor 61 from the front side.

An opening 71a through which the rotation shaft 61a of the motor 61 is inserted is provided in a front portion of the first motor case 71. The first motor case 71 is provided with a flow path 71b extending in the front-rear direction. An annular opening 71c is provided at a front end of the first motor case 71. The flow path 71b extends rearward from the annular opening 71c and branches into two lines at a rear end. Two openings provided at the rear end of the flow path 71b are blowout ports 71d. A portion forming the blowout port 71d extends rearward through the second motor case 72.

The second motor case 72 is located at an outer side the first motor case 71 in a lateral direction intersecting the front-rear direction. The second motor case 72 is attached to the motor 61 from the rear side. The second motor case 72 is provided with an opening 72a through which a wire extending from the motor 61 passes.

The front case 75 is disposed in the front side of the first motor case 71. The front case 75 forms an accommodation space S for accommodating the rotor 62 together with the front portion of the first motor case 71. The front case 75 opens forward.

The first outer case 73 and the second outer case 74 cover a part of the front case 75 and the first motor case 71. The first outer case 73 and the second outer case 74 form a cylindrical shape when being combined with each other. The cap 76 is fitted into front portions of the first outer case 73 and the second outer case 74. Rear portions of the first outer case 73 and the second outer case 74 are fitted with the second motor case 72 and a serration SS.

The cap 76 is attached to a front portion of the front case 75. The cap 76 opens forward. A suction port 63a is formed by an opening 76a of the cap 76 and an opening 75a of the front case 75.

The suction port 63a is opened forward in the direction of the rotation axis Ax of the rotor 62, and the blowout port 71d is opened rearward. The air sucked in from the suction port 63a is pressed against an inner wall 75b of the front case 75 by the blades 62b of the rotor 62 and is carried rearward, flows into the flow path 71b from the annular opening 71c of the first motor case 71, and is blown out to the air guide path 40 (see FIG. 2) from the blowout port 71d.

As described above, the diagonal flow fan 60 in the vehicle air cleaner 1 according to the present embodiment includes:
the motor 61;
the conical rotor 62 that includes the plurality of blades 62b which are attached to the outer peripheral surface thereof in an annular shape, and is rotated around the rotation axis Ax by the motor 61; and
the housing 63 that covers the rotor 62, and includes the suction port 63a opened on one side in the direction of the rotation axis Ax and the blowout port 71d opened on the other side in the direction of the rotation axis Ax.

Therefore, the vehicle air cleaner according to the present embodiment includes the diagonal flow fan 60 as a non-positive displacement air blower, so that a relatively large air volume and air pressure is easily ensured.

According to the vehicle air cleaner of the present embodiment, air is also continuously blown onto the object to be cleaned by the non-positive displacement air blower, so that a layer of air (air curtain) flowing on the surface of the object to be cleaned is formed. As a result, dirt is hardly attached to the object to be cleaned. Dirt is immediately removed even if the dirt adheres to the object to be cleaned. Further, the vehicle air cleaner can be mounted on the vehicle 100 at low cost.

Third Embodiment

Next, the case where an axial fan 80 shown in FIGS. 6 to 9 is used as the n n-positive displacement air blowing mechanism will be described.

Figure 6:
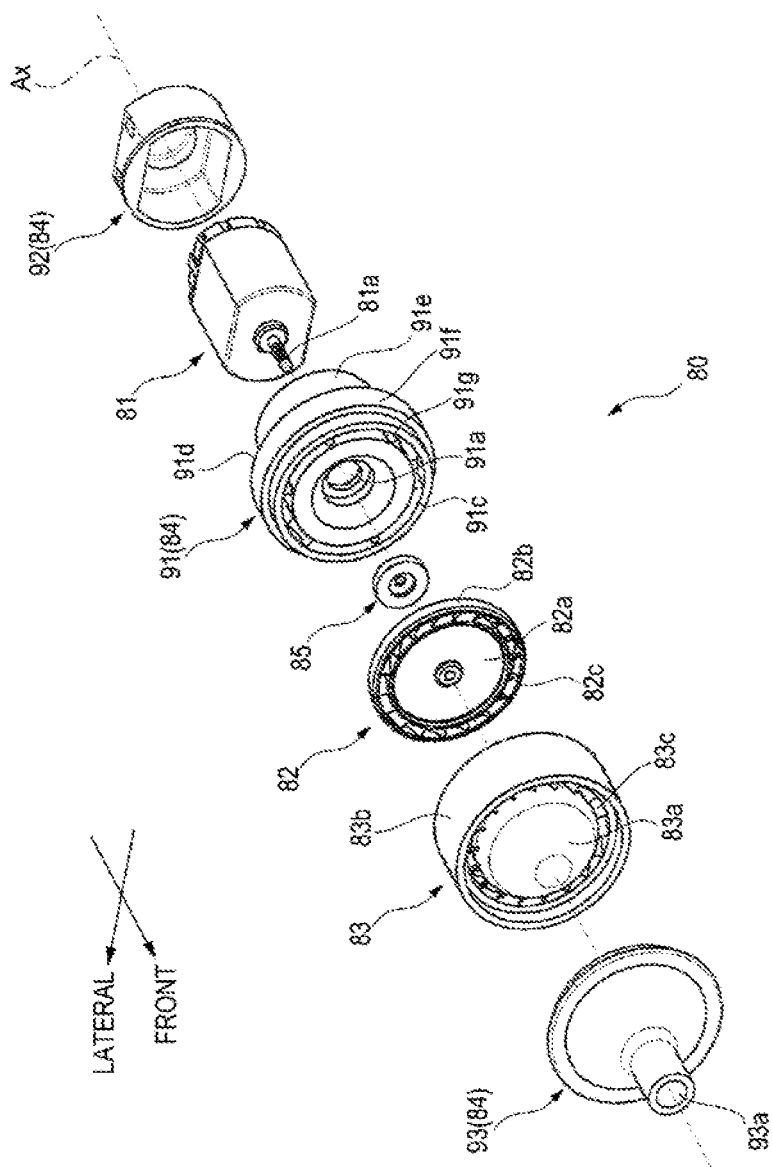
FIG. 6 is an exploded perspective view of an axial fan.
Figure 7:
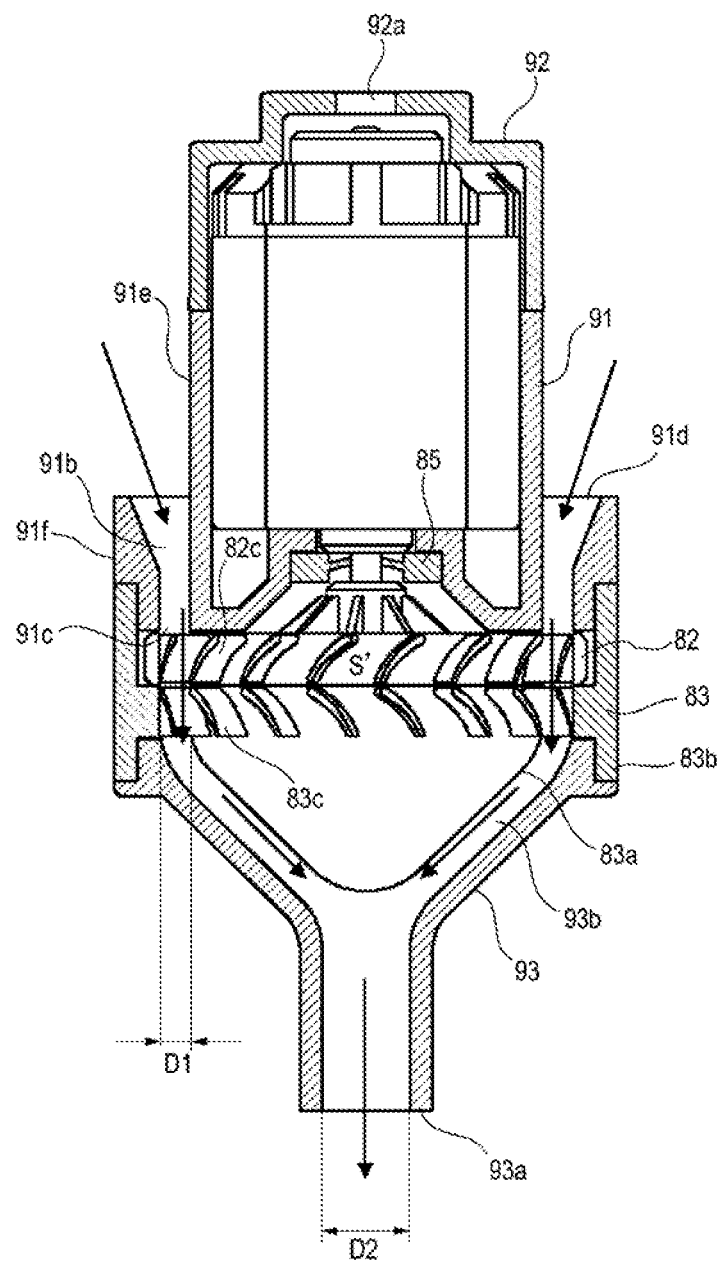
FIG. 7 is a sectional view of the axial fan.
Figure 8:
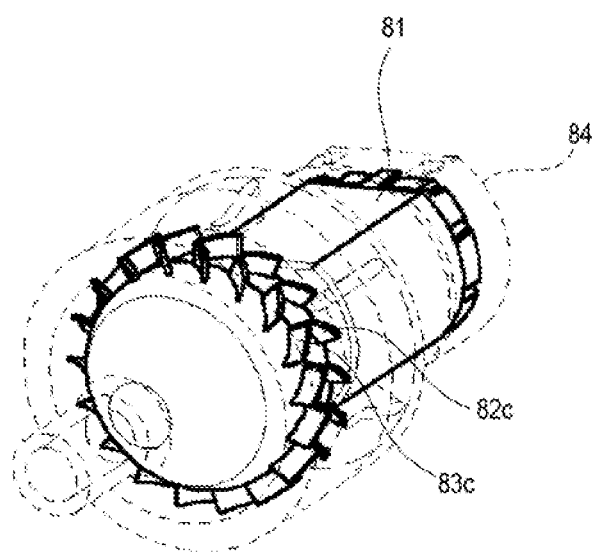
FIG. 8 is a view showing the structure of blades of a rotor blade unit and a stator blade unit of the axial fan.

FIG. 6 is an exploded perspective view of the axial fan 80. FIG. 7 is a sectional view of the axial fan 80. FIG. 8 is a view showing the structure of blades of a rotor blade unit and a stator blade unit of the axial fan, in which a housing 84 and a part of the rotor blade unit and stator blade unit are indicated by broken lines. As shown in FIGS. 6 and 7, the axial fan 80 includes a motor 81, a rotor blade unit 82, a stator blade unit 83 and the housing 84. In the following description, for the sake of convenience, a direction in which a rotation shaft 81a of the motor 81 protrudes in the direction of a rotation axis Ax of the motor 81 is referred to as the front side, and the opposite direction is referred to as the rear side.

The housing 84 includes a first motor case 91, a second motor case 92 and a cap 93. The first motor case 91 and the second motor case 92 are cylindrical members. The first motor case 91 includes a cylindrical first member 91e, a cylindrical second member 91f covering the outer side of a front portion of the first member 91e, and a plurality of partition portions 91g provided between an outer circumferential surface of the first member 91e and an inner circumferential surface of the second member 91f. The second motor case 92 is provided with an opening 92a through which a wire extending from the motor 81 passes.

The first motor case 91 and the second motor case 92 cover the motor 81. The first motor case 91 is attached to the motor 81 from the front side. The second motor case 92 is attached to the motor 81 from the rear side.

The front portion of the first member 91e of the first motor case 91 has a recessed part which is recessed rearward at the center, and an opening 91a through which the rotation shaft 81a of the motor 81 is inserted is provided on a bottom surface of the recessed part. A packing 85 is fitted into the bottom portion of the recessed part, and the rotation shaft 81a of the motor 81 is rotatably fixed to the housing 84 via the packing 85. A plurality of flow paths 91b extending in the front-rear direction are formed between the outer circumferential surface of the first member 91e and the inner circumferential surface of the second member 91f in the first motor case 91. A plurality of openings 91c are provided in the outer circumferential surface of the first member 91e and a front end of the second member 91f in the first motor case 91. Each flow path 91b extends rearward from the respective openings 91c, and is enlarged into a taper shape toward the inner circumferential surface side of the second member 91f at a rear end thereof. A plurality of openings provided at the rear end are suction ports 91d.

The rotor blade unit 82 includes a disk-shaped first member 82e, a ring-shaped second member 82b covering an outer side of the first member 82a, and a plurality of blades (acceleration, blade row or rotor blade row) 82c annularly provided between an outer circumferential surface of the first member 82a and an inner circumferential surface of the second member 82b. The rotation shaft 81a of the motor 81 is coupled to the rotor blade unit 82, and the rotor blade unit 82 rotates as the motor 81 rotates. The rotor blade unit 82 is rotated around the rotation axis Ax by the motor 81. As shown in FIG. 8, the plurality of blades 82c are arranged at equal intervals while being inclined in a predetermined direction with respect to the rotation axis of the rotor blade unit 82.

The stator blade unit 83 includes a substantially conical first member 83a, a cylindrical second member 83b covering an outer side of the first member 83a, and a plurality of blades (deceleration blade row or stator blade row) 83c provided in an annular shape between the first member 83a and the second member 83b. The first member 83a has a disk-shaped rear portion extending rearward from a bottom surface of the conical shape, and the plurality of blades 83c are provided between an outer peripheral surface of the disk-shaped rear portion and an inner peripheral surface of the second member 83b. An outer diameter of the disk-shaped rear portion of the first member 83a is the same as an outer diameter of the disk-shaped first member 82a of the rotor blade unit 82. As shown in FIG. 8, the plurality of blades 83c are arranged at equal intervals while being inclined in a predetermined direction with respect to the rotation axis of the rotor blade unit 82. An inclination direction of the plurality of blades 83c is reversed from a direction of the plurality of blades 82c of the rotor blade unit 82. The second member 83b extends rearward from the first member 83a, and is attached to a front portion of the second member 91f of the first motor case 91. The second member 83b forms an accommodation space S' that accommodates the rotor blade unit 82 together with the rear end of the first member 83a and the front end of the first motor case 91.

The cap 93 is attached to a front portion of the second member 83b of the stator blade unit 83. The cap 93 has a thin cylindrical front portion and a conical rear portion that is enlarged rearward from a rear end of the cylindrical shape. An opening provided at a front end of the thin cylindrical front portion is a blowout port 93a The conical rear portion has a conical internal space inside. The conical front portion of the stator blade unit 83 is accommodated in the internal space. A flow path 93b is formed by a flow path (the flow path on the stator blade unit 83 side) between an outer peripheral surface of the conical front portion of the stator blade unit 83 and an inner peripheral surface of the conical rear portion of the cap 93 and a flow path (the flow path on the blowout port 93 side) of the thin cylindrical front portion. In the flow path 93b, a sectional area D1 on the stator blade unit 83 side is set to be smaller than a sectional area D2 on the blowout port 93a side.

The suction port 91d is opened rearward in the direction of the rotation axis Ax of the rotor blade unit 82, and the blowout port 93a is opened rearward. The air sucked in from the suction port 91d flows into the rotor blade unit 82 from the plurality of openings 91c via the plurality of flow paths 91b of the first motor case 91. The air that has flowed into the rotor blade unit 82 is carried forward while being accelerated by the rotation of the blades 82a of the rotor blade unit 82, and flows into the stator blade unit 83. The air that has flowed into the stator blade unit 83 is carried forward while being decelerated by hitting the stationary blades 83a of the stator blade unit 83. The air that has flowed into the flow path 93b of the cap 93 is blown out from the blowout port 93a to the air guide path 40 (see FIG. 2). The air that has flowed into the stator blade unit 83 hits the blades 83a of the stator blade unit 83 and decelerates to increase the pressure thereof. Further, the air that has flowed into the flow path 93b of the cap 93 passes through the blowout port 93a side having a large sectional area so as to decelerate and increase the pressure thereof. Therefore, the air compressed by the stator blade unit 83 and the cap 93 is blown out to the air guide path 40 (see FIG. 2). The air pressure can be adjusted by changing the angle or the number of the blades 83a of the stator blade unit 83, or by changing the size of the sectional area of the flow path 93b of the cap 93.

Figure 9:
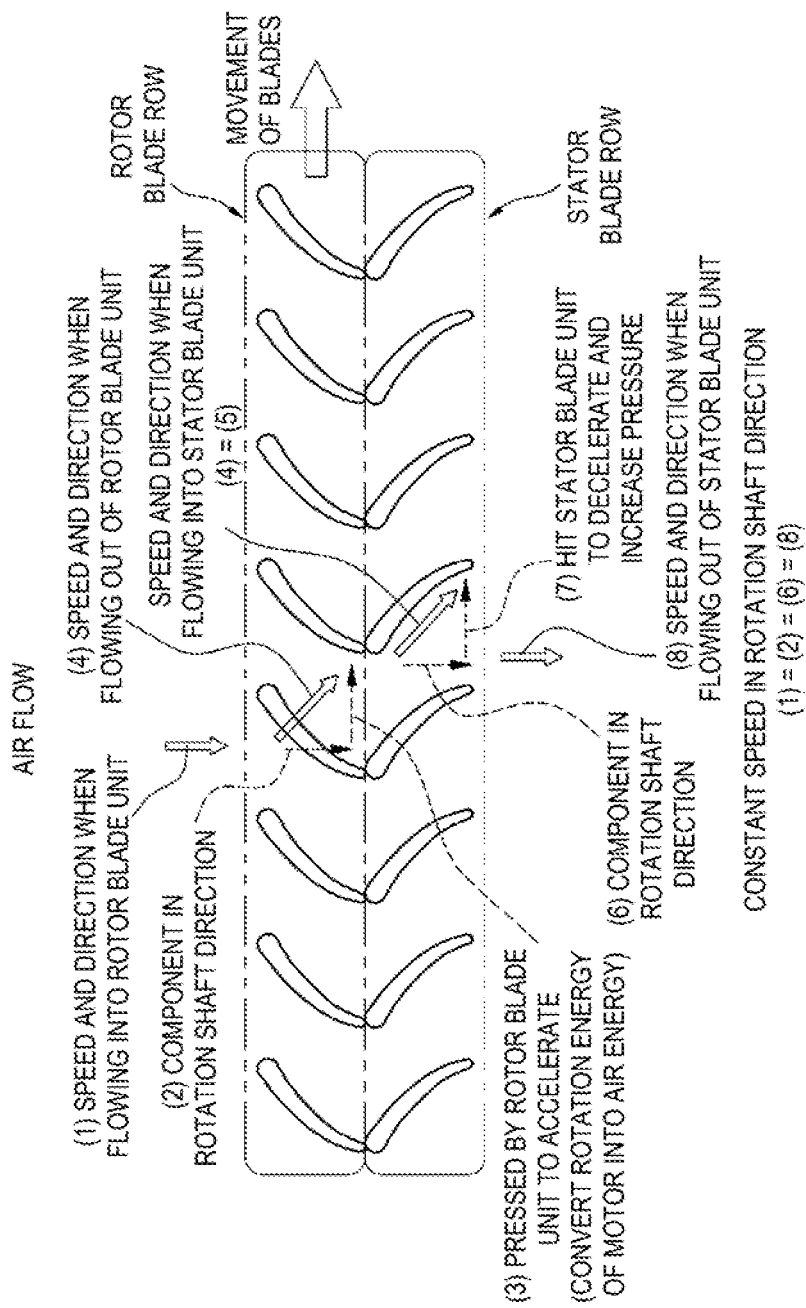
FIG. 9 is a view showing an air flow in the rotor blade unit and the stator blade unit of the axial fan.

The mechanism by which the air pressure is increased by the rotor blade unit 82 and the stator blade unit 83 will be described with reference to FIG. 9. In FIG. 9, a white arrow (arrows (1), (4), (5), (8)) indicates a speed and a direction of air when the air flows in or out. A dashed arrow (arrows (2), (3), (6), (7)) indicates a component of air in a rotation shaft direction or in a rotation direction.

When air having a predetermined speed flows into the rotor blade unit 82 in the axial direction (arrow (1)), rotation energy of the motor is converted into air energy by the rotation of the rotor blade unit 82, and a component of the air in the rotation direction of the rotor blade unit 82 accelerates (arrow (3)). Due to the component in the rotation shaft direction (arrow (2)) and the component in the rotation direction, the accelerated air flows out from the rotor blade unit 82 in a direction oblique to the rotation shaft direction (arrow (4)). The air that has flowed into the stator blade unit 83 (arrow (5)) hits the blades 83a of the stator blade unit 83, and therefore the component in the rotation direction is decelerated (arrow (7)). As a result, the air pressure increases in the stator blade unit 83. Due to the component in the rotation shaft direction (arrow (6)) and the component in the rotation direction (minus), the air whose pressure has increased from the stator blade unit 83 flows out in the rotation shall direction (arrow (8)).

In FIG. 9, the same number of the blades of the rotor blade unit 82 (rotor blade row) and the blades of the stator blade unit 83 (stator blade row) are arranged with the same angle, and in reversed directions. Therefore, the speed of the air flowing into the rotor blade unit 82 (arrow (1)), the component in the rotation shaft direction in the rotor blade unit 82 (arrow (2)), the component in the rotation shaft direction in the stator blade unit 83 (arrow (6)), and the air flowing out from the stator blade unit 83 (arrow (8)) are constant. Therefore, the air that has flowed into the rotor blade unit 82 flows out from the stator blade unit 83 at the same speed and with increased pressure due to the acceleration by the rotor blade unit 82 and the deceleration by the stator blade unit 83. As described above, the speed and pressure of the air flowing out from the stator blade unit 83 can be adjusted by changing the angle and number of the blades of the stator blade unit 83.

As described above, the axial fan 80 in the vehicle air cleaner 1 according to the present embodiment includes:
the motor 81;
the housing 84 that covers the rotor 81, and includes the suction port 91d opened on one side in the direction of the rotation axis Ax and the blowout port 93a opened on the other side in the direction of the rotation axis Ax;
the rotor blade unit 82 that includes the plurality of blades 82b which are attached in an annular shape and is rotated around the rotation axis Ax by the motor 81; and
the stator blade unit 83 that is fixed to the housing 84 and includes the plurality of blades 83b which are attached in an annular shape in a direction reversed from that of the plurality of blades 82b.

Therefore, the vehicle air cleaner according to the present embodiment includes the axial fan 80 as a non-positive displacement air blower, so that a relatively large air volume and air pressure is easily ensured.

According to the vehicle air cleaner of the present embodiment, air is also continuously blown onto the object to be cleaned by the non-positive displacement air blower, so that a layer of air (air curtain) flowing on the surface of the object to be cleaned is formed. As a result, dirt is hardly attached to the object to be cleaned. Dirt is immediately removed even if the dirt adheres to the object to be cleaned. Further, the vehicle air cleaner can be mounted on the vehicle 100 at low cost.

Fourth Embodiment

A vehicle air cleaner 201 according to a fourth embodiment will be described with reference to the drawings. The vehicle air cleaner 201 is provided at the rear portion of the vehicle 100 in the same manner as the vehicle air cleaner 1 according to the first embodiment.

Figure 10:
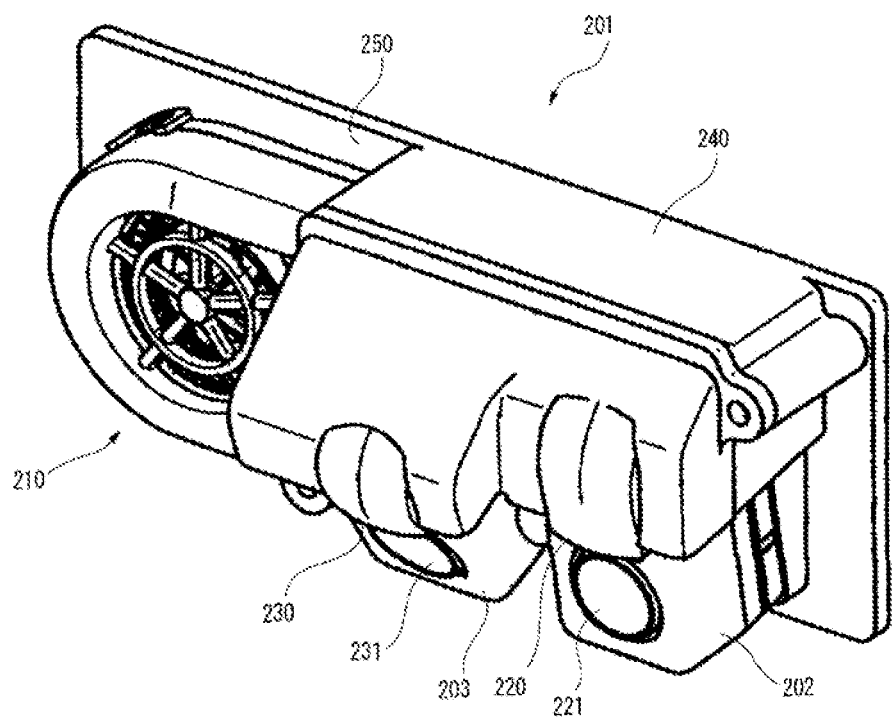
FIG. 10 is a perspective view of a vehicle air cleaner according to a fourth embodiment.

FIG. 10 is a perspective view of the vehicle air cleaner 201. As shown in FIG. 10, the vehicle air cleaner 201 is integrated with a rear camera 202 and a back camera 203. The vehicle air cleaner 201 blows air to the rear camera 202 and the back camera 203.

The rear camera 202 always acquires an image behind the vehicle 100. The rear camera 202 always acquires an image behind the vehicle 100 with a relatively wide angle of view. For example, information output from the rear camera 202 can be used to confirm the presence or absence of another vehicle that is about to pass the own vehicle from behind.

The back camera 203 acquires an image of a rear side of the vehicle 100 when the vehicle 100 moves rearward. The back camera 203 acquires information in the vicinity of the own vehicle when the vehicle is moving rearward. For example, information output from the back camera 203 can be used to confirm the presence of an obstacle near the own vehicle during parking or the like.

The vehicle air cleaner 201 includes a multi-blade fan 210 as a non-positive displacement air blower, a casing 240, a rear ejection nozzle 220, a back ejection nozzle 230, and a base frame 250 that supports them. The rear camera 202 and the back camera 203 are attached to the base frame 250.

The rear ejection nozzle 220 ejects air onto a lens 221 of the rear camera 202. The rear ejection nozzle 220 is provided above the lens 221 of the rear camera 202. The back ejection nozzle 230 ejects air onto a lens 231 (clean surface) of the back camera 3. The back ejection nozzle 230 is provided above the lens 231 of the back camera 203.

The multi-blade fan 210 has the same structure as the multi-blade fan 1 of the first embodiment, and detailed description thereof is omitted.

Figure 11:
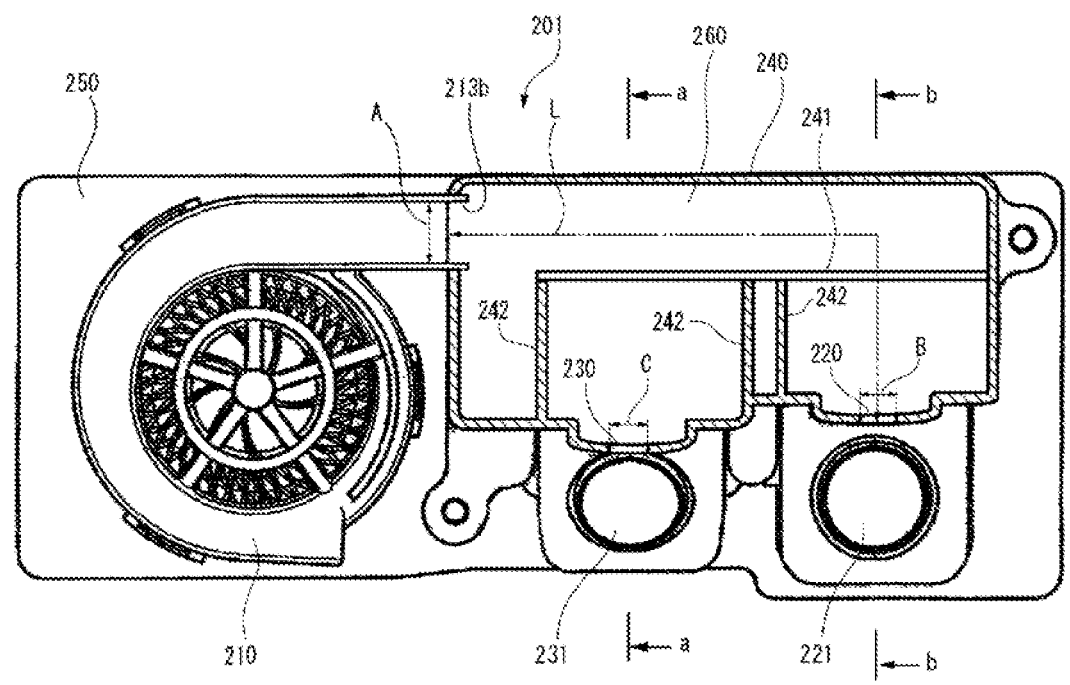
FIG. 11 is a front view of the vehicle air cleaner.

FIG. 11 is a front view of the vehicle air cleaner 201, and shows a flow rate adjustment chamber 260 provided inside the casing 240 by cutting out a front surface of the casing 240. As shown in FIG. 11, the flow rate adjustment chamber 260 is provided inside the casing 240. The flow rate adjustment chamber 260 is a space for temporarily storing the air sent out from the multi-blade fan 210. In the casing 240 in which the flow rate adjustment chamber 260 is adjusted, the rear ejection nozzle 220 is provided at a position facing the lens 221, and the back ejection nozzle 230 is provided at a position facing the lens 231. Both the rear ejection nozzle 220 and the back ejection nozzle 230 are openings provided in the casing 240 to allow communication between the outside and the flow rate adjustment chamber 260.

Ribs 242 provided in the flow rate adjustment chamber 260 are not provided for the purpose of guiding the air flowing in the flow rate adjustment chamber 260 to the rear ejection nozzle 220 or the back ejection nozzle 230. These ribs 242 are portions standing from a bottom surface 243 (a surface in contact with the base frame 250) of the casing 240 to form portions of the casing 240 where the rear ejection nozzle 220 and the back ejection nozzle 230 are formed.

Figure 12A:
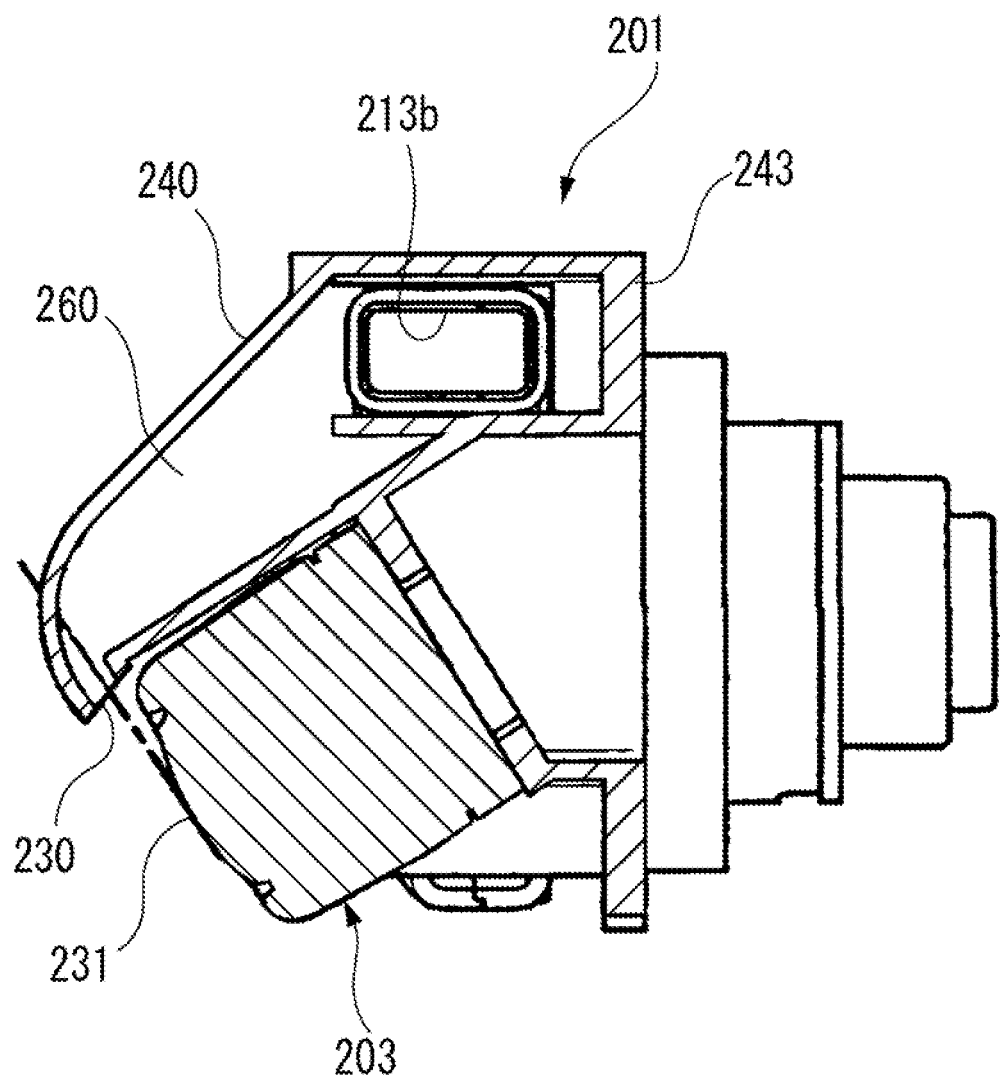
FIG. 12A is a side sectional view of the vehicle air cleaner.
Figure 12B:
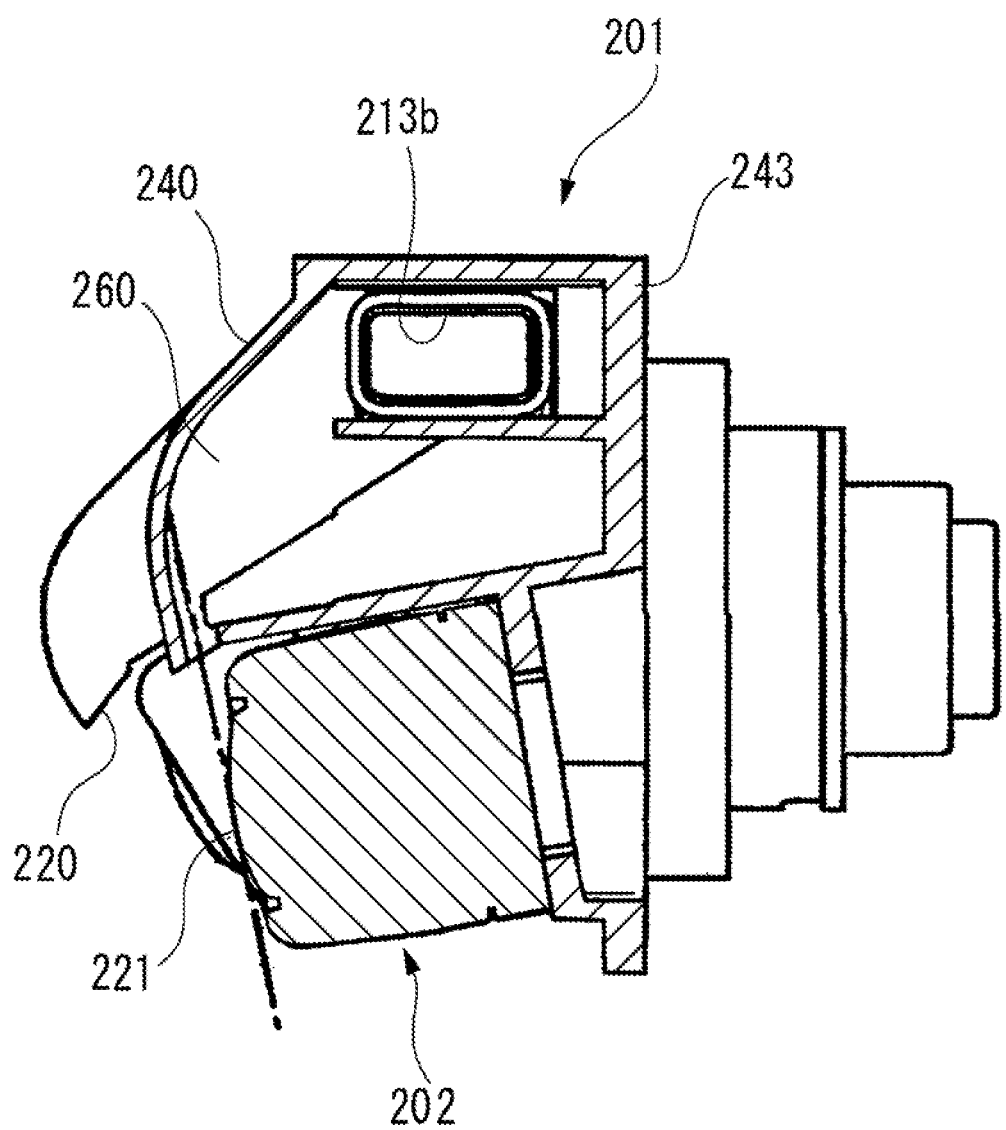
FIG. 12B is a side sectional view of the vehicle air cleaner.

FIGS. 12A and 12B are side sectional views of the vehicle air cleaner 201. FIG. 12A is a sectional view seen from the arrow direction of a line a-a of FIG. 11, and FIG. 12B is a sectional view seen from the arrow direction of a line b-b of FIG. 11. As shown in FIG. 11, the air sent out from a blowout port 213b of the multi-blade fan 210 is guided to the flow rate adjustment chamber 260. When the air is sent from the multi-blade fan 210 the air staying in the flow rate adjustment chamber 260 is pushed out from the rear ejection nozzle 220 and the back ejection nozzle 230. Then, as shown in FIG. 12A, the air is blown from the back ejection nozzle 230 to the lens 231. Further, as shown in FIG. 12B, the air is blown from the rear ejection nozzle 220 to the lens 221.

According to the vehicle air cleaner 201 of the present embodiment, a single flow rate adjustment chamber 260 that adjusts the flow rate of the air from the rear ejection nozzle 220 and the back ejection nozzle 230 is provided in a pipe line between the multi-blade fan 210 and the rear ejection nozzle 220 and the back ejection nozzle 230. That is, the air sent out from the multi-blade fan 210 is sent into the single flow rate adjustment chamber 260, and is branched and sent out to the rear ejection nozzle 220 and the back ejection nozzle 230.

Unlike in the present embodiment, when a rear pipe line from the multi-blade fan to the rear ejection nozzle and a back pipe line from the multi-blade fan to the back ejection nozzle are provided separately, it is necessary to consider the pressure loss of the rear pipe line and the pressure loss of the back pipe line separately. In consideration of the pressure loss of each pipe line, it is necessary to adjust the ejection pressure ejected from the rear ejection nozzle, and the ejection pressure ejected from the back ejection nozzle.

However, according to the vehicle air cleaner 201 of the present embodiment, the pipe lines from the multi-blade fan 210 to the rear ejection nozzle 220 and to the back ejection nozzle 230 are common, and therefore, there is no need to consider the pressure loss for each pipe line.

For example, if opening areas of the rear ejection nozzle 220 and the back ejection nozzle 230 are made equal, air can be ejected from the rear ejection nozzle 220 and the back ejection nozzle 230 at the same ejection speed and ejection pressure. Alternatively, if the opening area of the rear ejection nozzle 220 is made smaller than the opening area of the back ejection nozzle 230, the ejection speed and ejection pressure of the rear ejection nozzle 220 can be made higher than the ejection speed and ejection pressure of the back ejection nozzle 230. In this way, according to the vehicle air cleaner 201 of the present embodiment, it is easy to control the flow rate and pressure of air sent out from the rear ejection nozzle 220 and the back ejection nozzle 230.

The blowout port 213b facing the flow rate adjustment chamber 260 is preferably opened in a direction intersecting with an opening direction of the rear ejection nozzle 220 and the back ejection nozzle 230. Unlike in the present embodiment, for example, when the blowout port 213 is open on an extension line in the opening direction of the rear ejection nozzle, air sent out from the blowout port 213b is sent out from the rear ejection nozzle as it is, air for the rear ejection nozzle is more than for the back ejection nozzle, and air is likely to be ejected at a high flow rate.

In the present embodiment, the flow rate adjustment chamber 260 is provided with a rectifying plate 241 that extends along the opening direction of the blowout pan 213b. The rectifying plate 241 prevents the air sent out from the blowout port 213b from directly entering the rear ejection nozzle 220 and the back ejection nozzle 230.

The dimension of the flow rate adjustment chamber 260 in the direction orthogonal to a flow direction is preferably larger than an opening area of the blowout port 213b. When an inner volume of the flow rate adjustment chamber 260 is V, a nozzle far from the blowout port among the rear ejection nozzle 220 and the back ejection nozzle 230 is a long-distance nozzle, and a virtual pipe line length drawn from the center of the blowout port 213b along the pipe line to the center of the long-distance nozzle is L, a virtual sectional area of a cross section of the flow rate adjustment chamber 260 that is orthogonal to the flow direction of the air flowing from the blowout port 213b to the long-distance nozzle can be approximated by V/L. This virtual sectional area is preferably V/L>A, where A is the opening area of the blowout port 213b. Since the virtual sectional area V/L is large, pressure loss is unlikely to occur in the air flowing through the flow rate adjustment chamber 260.

The flow rate adjustment chamber 260 is preferably thicker than the virtual pipe line length L. When an equivalent circle diameter of the virtual sectional area of the flow rate adjustment chamber 260 is D, the virtual pipe line length L is preferably less than five times the equivalent circle diameter. Accordingly, it is easy to further reduce pressure loss.

When the opening area of the rear ejection nozzle 220 is B and the opening area of the back ejection nozzle 230 is C, it is preferable that V/L>B and V/L>C. Accordingly, internal pressure of the flow rate adjustment chamber 260 can be easily increased, and the rear ejection nozzle 220 and the back ejection nozzle 230 can easily eject air at higher ejection pressure.

In the present embodiment, the rear ejection nozzle 220 and the back ejection nozzle 230 are directly formed in the casing 240 in which the flow rate adjustment chamber 260 is formed. Therefore, the rear ejection nozzle 220 and the back ejection nozzle 230 can be formed with a simple configuration. Also, unlike in the present embodiment, a rear ejection nozzle and a back ejection nozzle may be provided separately from the casing 240, and the flow rate adjustment chamber may be connected to the rear ejection nozzle and the back ejection nozzle using a hose or a pipe line.

The vehicle air cleaner 201 may adopt a sirocco fan, a turbo fan, a propeller fan, a diagonal flow fan or the like in addition to the multi-blade fan 210 as a non-positive displacement air blower. Further, the non-positive displacement air blower may include a blower in addition to the fan. The non-positive displacement air blower can easily ensure a relatively large air volume and air pressure with a compact structure.

Fifth Embodiment

Figure 13:
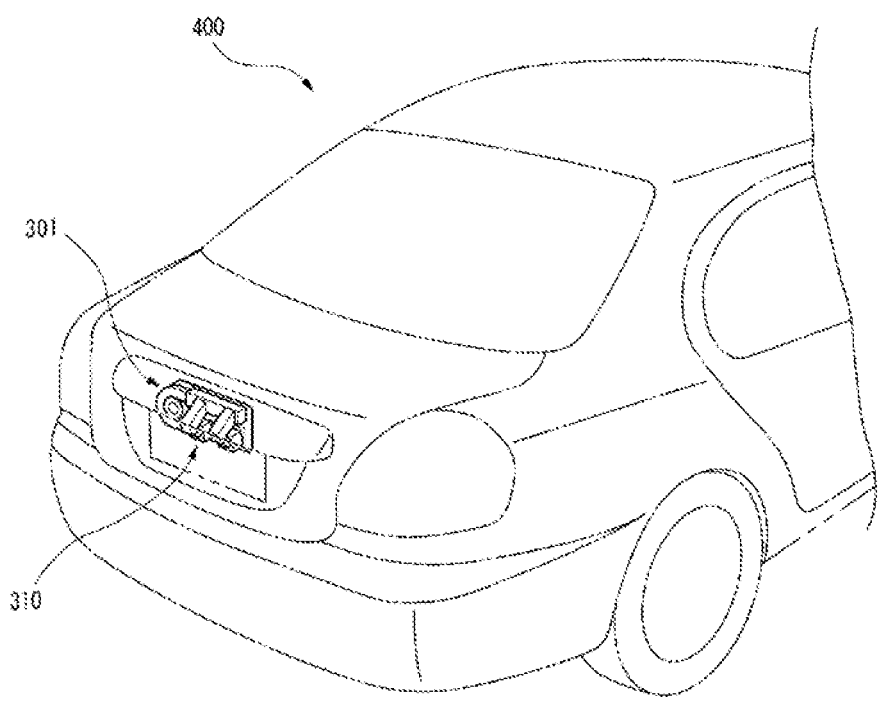
FIG. 13 is a schematic view showing a vehicle to which a vehicle air cleaner unit according to a fifth embodiment is attached.

A vehicle air cleaner unit 30 including a vehicle air cleaner 310 according to a fifth embodiment (hereinafter simply referred to as air cleaner 310) will be described with reference to the drawings. FIG. 13 is a schematic view showing a vehicle 400 to which the vehicle air cleaner unit 301 is attached. As shown in FIG. 13, the vehicle air cleaner unit 301 is provided at a rear portion of the vehicle 400. The air cleaner 310 is incorporated in the vehicle air cleaner unit 301.

Figure 14:
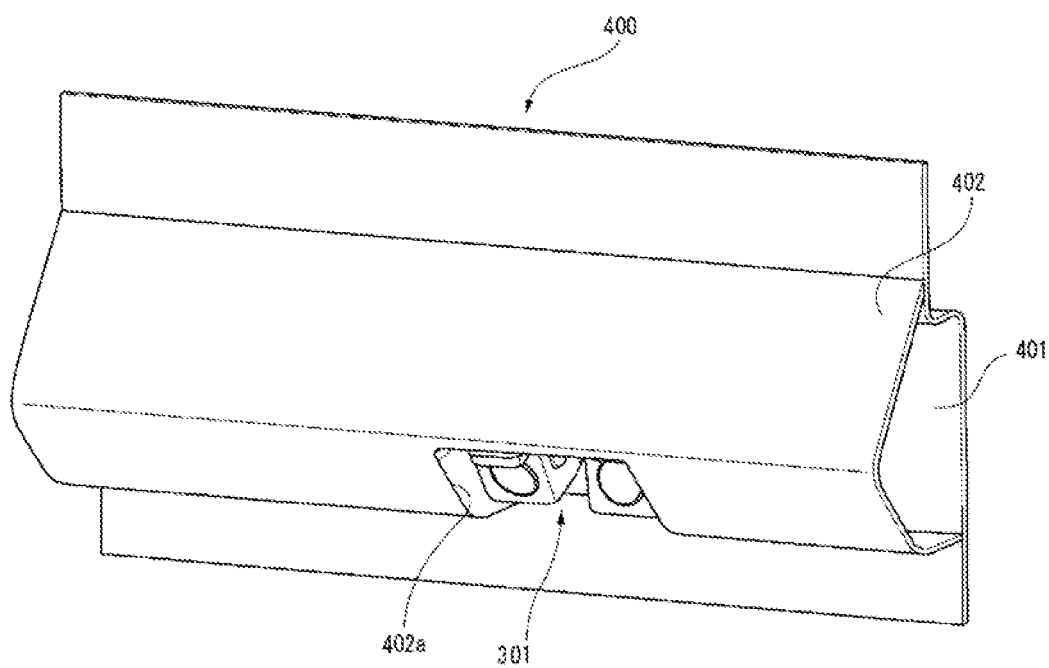
FIG. 14 is a perspective view showing the vehicle air cleaner unit attached to the vehicle.
Figure 15:
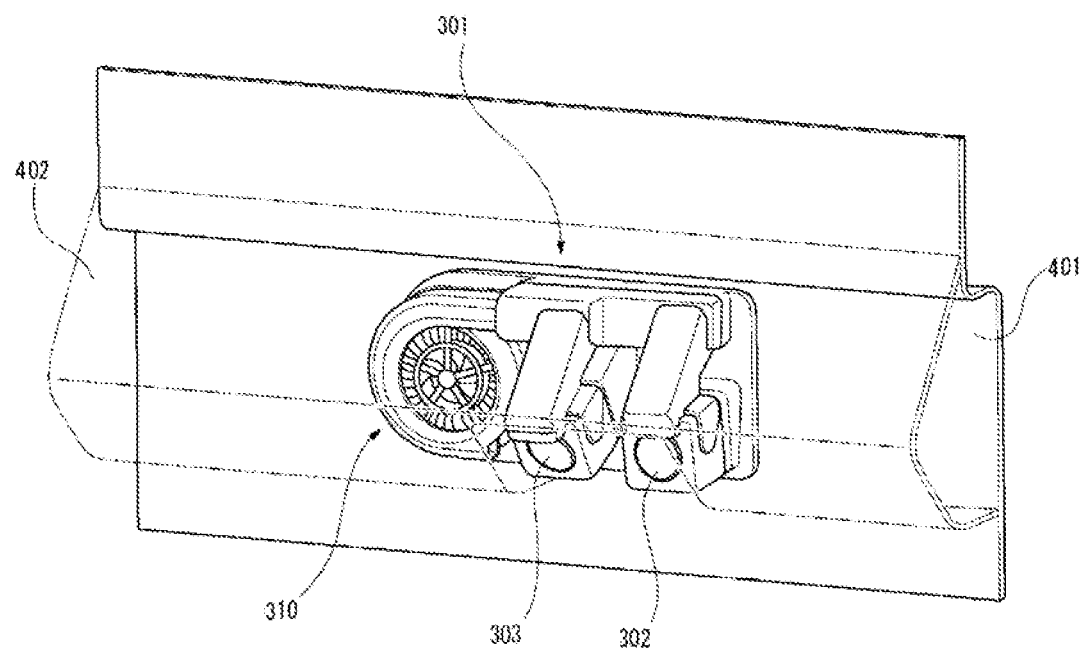
FIG. 15 is a perspective view showing the vehicle air cleaner unit attached to the vehicle as seen through a garnish.

FIG. 14 is a perspective view showing the vehicle air cleaner unit 301 attached to the vehicle 400. FIG. 15 is a view of FIG. 14 as seen through the garnish 402. As shown in FIG. 14, vehicle appearance components of the vehicle 400 include a vehicle body metal plate 401 and the garnish 402.

As shown in FIG. 15, the vehicle air cleaner unit 301 according to the present embodiment includes the air cleaner 310, a rear camera 302, and a back camera 303. The air cleaner 310 blows air to the rear camera 302 and the back camera 303. As shown in FIG. 14, the rear camera 302 and the back camera 303 are exposed from a camera opening 402a provided on the garnish 402.

The rear camera 302 always acquires an image behind the vehicle 400. The rear camera 302 always acquires an image behind the vehicle 400 with a relatively wide angle of view. For example, information output from the rear camera 302 can be used to confirm the presence or absence of another vehicle that is about to pass the own vehicle 400 from behind.

The back camera 303 acquires an image of a rear side of the vehicle 400 when the vehicle 400 moves rearward. The back camera 303 acquires information in the vicinity of the own vehicle 400 when the vehicle is moving rearward. For example, information output from the back camera 303 can be used to confirm the presence of an obstacle near the own vehicle 400 during parking or the like.

The air cleaner 310 is integrated with the rear camera 392 and the back camera 303. Therefore, the relative position between an air outlet of the air cleaner 310 and the rear camera 392 and the relative position between an air outlet of the air cleaner 310 and the back camera 303 are hardly changed.

Figure 16:
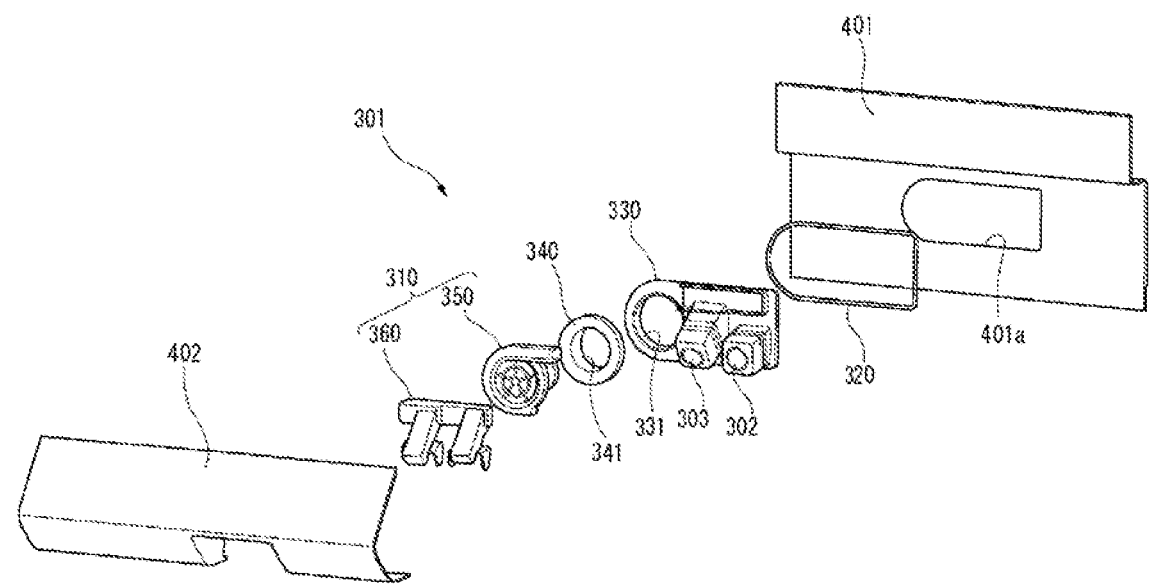
FIG. 16 is an exploded perspective view of the vehicle air cleaner unit.

FIG. 16 is an exploded perspective view of the vehicle air cleaner unit 301. As shown in FIG. 16, the vehicle air cleaner unit 301 includes a camera rubber member 320, a camera base 330 on which the rear camera 302 and the back camera 303 are mounted, a fan rubber member 340, a blower fan 359, and a duct 360. The air cleaner 310 includes the blower fan 350 and the duct 360. The blower fan 350 is a kind of non-positive displacement fan.

The camera rubber member 320 is a frame-shaped rubber member that is slightly larger than an opening 401a provided on the vehicle body metal plate 401. The camera base 330 is provided with a motor opening 331 into which a motor 351 of the blower fan 350 described later is inserted. The fan rubber member 340 is a ring-shaped rubber member that is slightly larger than the motor opening 331.

Figure 17:
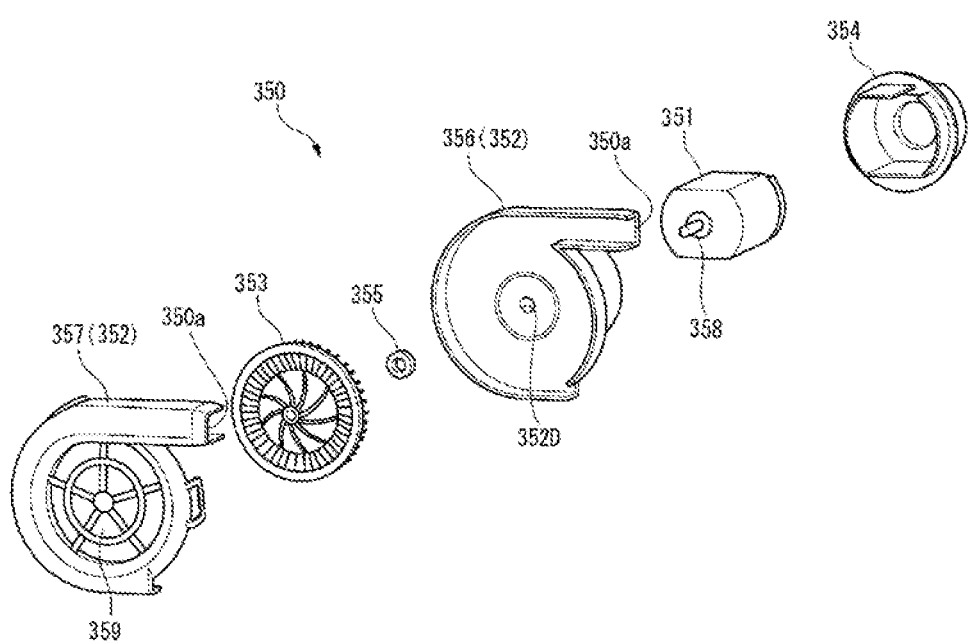
FIG. 17 is an exploded perspective view of the blower fan.

FIG. 17 is an exploded perspective view of the blower fan 350. As shown in FIG. 17, the blower fan 350 includes the motor 351, a base frame 352, an impeller 353 (air blowing mechanism), a waterproof cap 354, and an output shaft rubber member 355. The base frame 352 is divided into a first frame 356 and a second frame 357.

The impeller 353 is accommodated in the base frame 352 in a rotatable manner. The base frame 352 has an air blowing port 350a. When the impeller 353 rotates, air is sent out from the air blowing port 350a toward the outside of the blower fan 350. The air sent out from the blower fan 350 is blown to the rear camera 302 and the back camera 303 through the duct 360.

The motor 351 has an output shaft 358. The output shaft 358 passes through the first, frame 356 and is fixed to the center axis of the impeller 353. The impeller 353 rotates as the motor 351 rotates the output shaft 358. The output shall rubber member 355 is inserted through the output shaft 358. The output shaft rubber member 355 is provided between the impeller 353 and the first frame 356.

The impeller 353 sucks air in the rotation shaft direction and sends out air in the radial direction. The air sent out from the impeller 353 is guided along the base frame 352 to the air blowing port 350a. Air is blown from the air blowing port 350a through the duct 360 to the rear camera 302 and the back camera 303.

Figure 18:
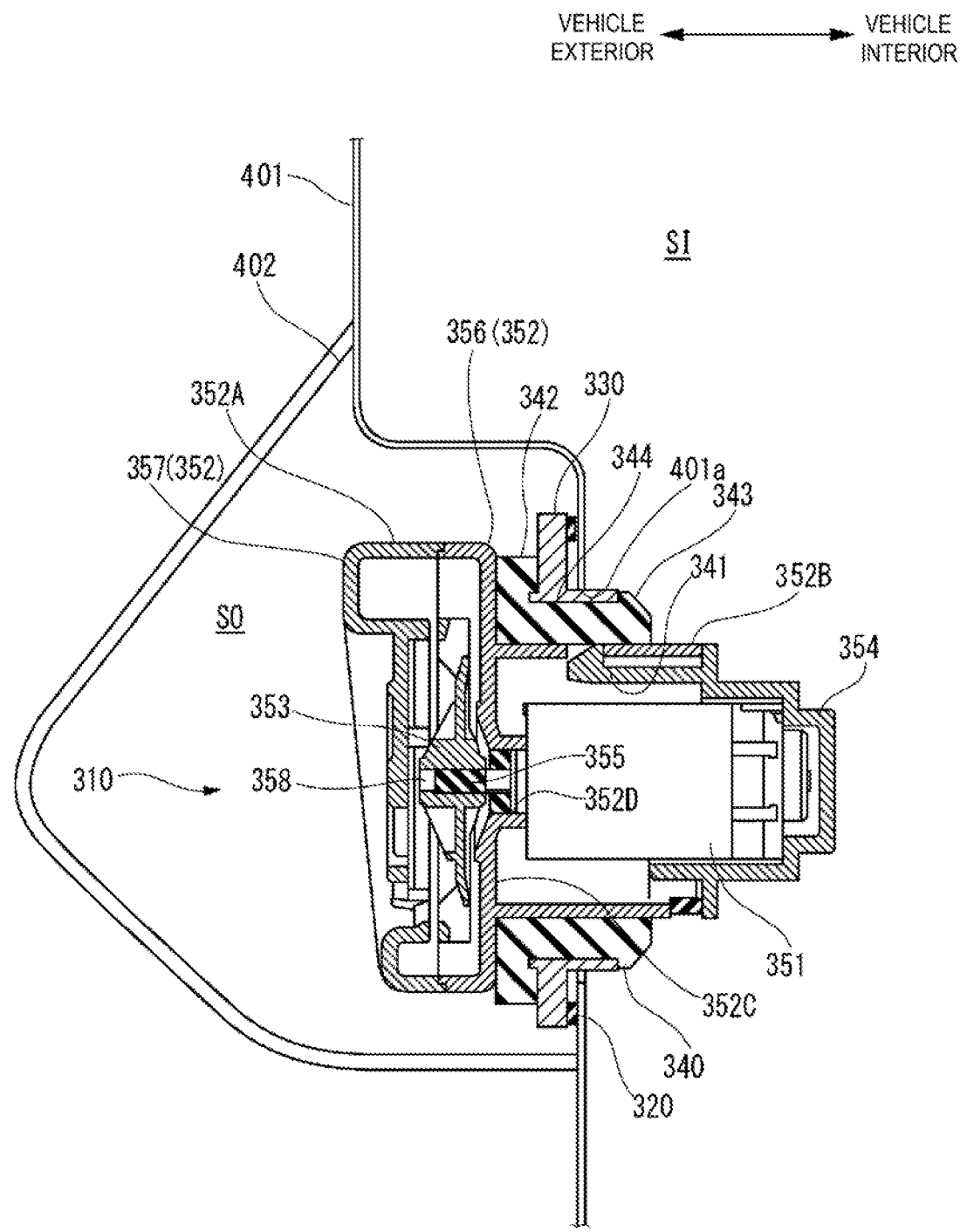
FIG. 18 is a sectional view of the blower fan.

FIG. 18 is a sectional view along the output shall 358 of the blower fan 350. As shown in FIG. 18, the base frame 352 includes an air blowing casing portion 352A that accommodates the impeller 353, and a motor attachment portion 352C to which the motor 351 is attached. A part of the air blowing easing portion 352A and the motor attachment portion 352C are integrally formed as the first frame 356. The second frame 357 is formed by the remaining part of the air blowing casing portion 352A. The first frame 356 has a partition wall 352B provided with a through hole 352D. The air blowing casing portion 352A is on the vehicle exterior side of the partition wall 352B. The motor attachment portion 352C is on the vehicle interior side of the partition wall 352B.

The impeller 353 is accommodated in the air blowing casing portion 352A in a rotatable manner. The motor 351 is attached to the motor attachment portion 352C. The output shaft 358 of the motor 351 passes through the through hole 352D. An end portion of the output shaft 358 of the motor 351 is fixed to the impeller 353. An electronic circuit for controlling the motor 351 may be attached to the motor attachment portion 352C.

The output shaft rubber member 355 is provided between the output shaft 358 of the motor 351 and the through hole 352D of the base frame 352. The output shaft rubber member 355 prevents water from entering the motor 351 through a gap between the output shaft 358 and the through hole 352D.

As shown in FIG. 18, an inner space SI inside the vehicle 400 and an outer space SO outside the vehicle 400 are divided by the vehicle body metal plate 401. The inner space SI and the outer space SO are communicated with each other through an opening 401a provided in the vehicle body metal plate 401. The air cleaner 310 is provided across the inner space SI and the outer space SO. The air cleaner 310 is fitted in the opening 401a provided in the vehicle body metal plate 401 in a watertight manner.

When the vehicle appearance component includes a plurality of components, the opening 401a provided in the vehicle body metal plate 401 may be a gap that is formed when the plurality of components are combined and communicates the internal space and the external space of the vehicle appearance component.

The camera base 330 is attached to an outer surface of the vehicle body metal plate 401 via the camera rubber member 320. The camera rubber member 320 prevents water from entering the inner space SI through a gap between the camera base 330 and the vehicle body metal plate 401.

The fan rubber member 340 is fitted inside the motor opening 331 of the camera base 330. The air cleaner 310 is fitted in an inner peripheral bole 341 of the fan rubber member 340. The fan rubber member 340 is a substantially cylindrical member. The fan rubber member 340 includes an outer flange portion 342 disposed in the outer space SO, an inner flange portion 343 disposed in the inner space SI, and a connecting portion 344 that connects the outer flange portion 342 and the inner flange portion 343.

An inner surface of the outer flange portion 342 is in contact with an outer surface of the camera base 330 in a watertight manner, outer peripheral surface of, the connecting portion 344 is in contact with an inner surface forming the motor opening 331 of the camera base 330 in a watertight manner. An outer surface of the inner flange portion 343 is in contact with an inner surface of the camera base 330 in a watertight manner. An outer surface of the outer flange portion 342 and an inner surface of the connecting portion 344 are in contact with an outer surface of the base frame 352 of the air cleaner 310 in a watertight manner. As a result, the air cleaner 310 is attached to the vehicle body metal plate 401 in a watertight manner.

The outer flange portion 342 and the inner flange portion 343 are larger than the opening 401a provided in the vehicle body metal plate 401. Therefore, when the air cleaner 310 is attached to the vehicle body metal plate 401 via the fan rubber member 340, the fan rubber member 340 is elastically deformed and a tensile force is generated in the radial direction. Accordingly, the camera base 330 is firmly attached to the vehicle body metal plate 401.

Further, the inner diameter of the fan rubber member 340 is slightly larger than the outer diameter of the motor attachment portion 352C. Therefore, when the air cleaner 310 is inserted through the fan rubber member 340, the fan rubber member 340 is elastically deformed and a tensile force is generated in the radial direction. Accordingly, the air cleaner 310 is firmly attached to the fan rubber member 340.

Effects

As described above, the air cleaner 310 includes the motor 351 that is an electronic component. For this reason, unlike the embodiments described above, if the entire vehicle air cleaner is waterproof, the vehicle air cleaner is increased in size. Alternatively, if the entire vehicle air cleaner is made as a waterproof internal space of the vehicle, the internal space of the vehicle is also increased in size.

However, in the embodiments described above, the camera rubber member 320, the fan rubber member 340, and the output shaft rubber member 355 form a waterproof member. According to the air cleaner 310 of the present embodiment, the outer space SO exposed to water on the outer side of the waterproof member and the waterproof inner space SI on the inner side of the waterproof member are partitioned. The motor 351 is disposed in the inner space SI that is waterproofed by the waterproof member, while the impeller 353 which is an air blowing mechanism is disposed in the outer space SO that is not waterproofed. The impeller 353 has no problem in function even when being exposed to water, so that the waterproof specification of the impeller 353 is omitted. Accordingly, the structure around the impeller 353 is made compact. On the other hand, the motor 351 requiring waterproofing is reliably waterproofed by the waterproof member.

As shown in FIG. 18, in the present embodiment, the waterproof cap 354 is attached to an end portion of the base frame 352 on the vehicle interior side in a watertight manner. The motor 351 is disposed in a space formed by the base frame 352 and the waterproof cap 354. The wires of the motor 351 are inserted through a gap formed by the waterproof cap 354 and the base frame 352 with a waterproof member (not shown). In this way, the base frame 352 and the waterproof cap 354 can keep the motor 351 away from water even if the water enters the inner space SI inside the opening 401a of the vehicle body metal plate 401.

As shown in FIG. 18, in the present embodiment, the camera rubber member 320 and the fan rubber member 340 are provided on the outer surface of the vehicle body metal plate 401 so as to surround the opening 401a. Compared with a case where these waterproof members are provided on the inner surface of the vehicle body metal plate 401, water is less likely to enter the inner space SI inside the opening 401a of the vehicle body metal plate 401.

As shown in FIG. 17, in the present embodiment, an air inlet 359 of the impeller 353 opens in a direction other than the direction facing the vehicle body metal plate 401. In the example shown in FIG. 17, air is sucked in from the outside of the vehicle 400 in the direction of the output shaft 358. In other words, in the illustrated example, the air inlet 359 is open on the side opposite to the vehicle body metal plate 401.

Figure 19:
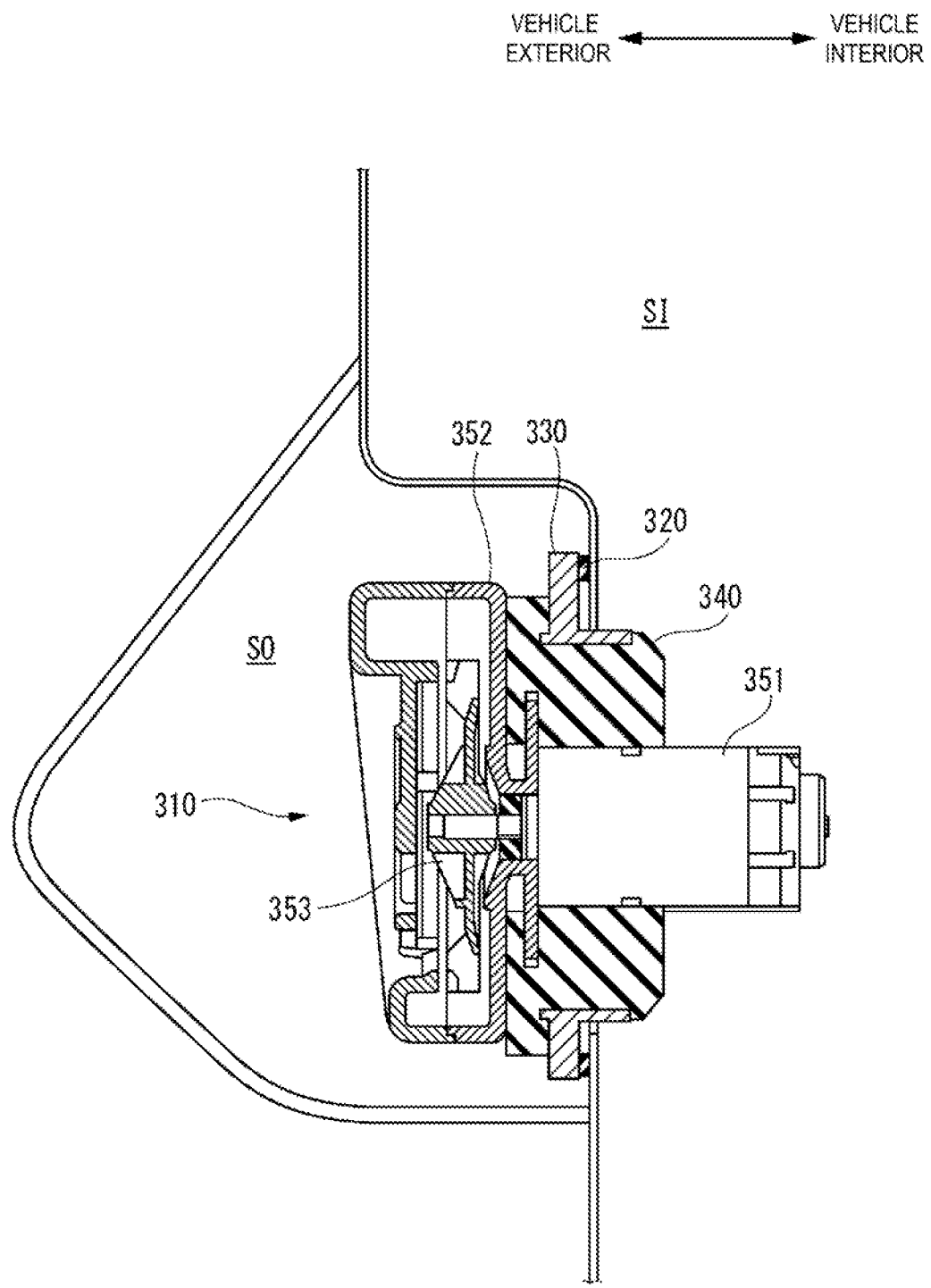
FIG. 19 is a cross-sectional view of a blower fan of a vehicle air cleaner according to a modification.

The structure in which the motor 351 is attached to the base frame 352 has been described in the embodiments, but the present invention is not limited to this. As shown in FIG. 19, the motor 351 may be directly supported by a waterproof member.

Further, in the example shown in FIG. 19, the inner area SI on the inner side of the vehicle body metal plate 401 is an area that is waterproofed in the structure on the vehicle 400 side. Therefore, the only path through which water can enter the inner area SI is the opening 401a provided in the vehicle body metal plate 401. The opening 401a of the vehicle body metal plate 401 is waterproofed by the waterproof member, so that water does not enter the internal space. Therefore, the motor 351 is not provided with the waterproof cap 54. With such a configuration, the motor 351 can also be waterproofed. In the example shown in FIG. 19, the base frame 352 and the motor 351 are supported by the fan rubber member 340.

Modifications

In the embodiments described above, the vehicle air cleaner 1, 201 and the vehicle air cleaner unit 301 is provided at the rear portion of the vehicle 100, 400, but the present invention is not limited thereto. They may also be provided in a front portion of the vehicle 100, 400, or a side portion of the vehicle 100, 400.

In the embodiments described above, the vehicle air cleaner 1, 201 and the vehicle air cleaner unit 301 are integrated with the rear camera 2, 203, 303, and back camera 3, 203, 303 which are the objects to be cleaned, but the vehicle air cleaner 1, 201 and the vehicle air cleaner unit 301 may be separate from the object to be cleaned. In the examples described above, the vehicle air cleaner 1, 201 and the vehicle air cleaner unit 301 blow air onto the lens of the rear camera 2, 203, 303, and back camera 3, 203, 303, but the vehicle air cleaner 1, 201 and the vehicle air cleaner unit 301 may also blow air onto an outer cover that protects the lens of the rear camera 2, 202, 302, and back camera 3, 203, 303.

In the examples described above, the rear camera 2, 202, 302, and the back camera 3, 203, 303 are described as the objects to be cleaned, but the vehicle air cleaner unit 1 may also configured to blow air onto a LiDAR or a cover that covers the LiDAR, LiDAR is an abbreviation for Light Detection and Ranging or Laser Imaging Detection and Ranging.

The LiDAR is a sensor which generally emits invisible light forward and acquires information such as a distance to an object, a shape of the object, a material of the object, and a color of the object based on the emitted light and return light, in general, a LiDAR includes a light emitting unit that emits infrared rays or near infrared rays, a light receiving unit that receives the infrared rays or near infrared rays, a filter that only transmits infrared rays or near infrared rays, a transparent cover that transmits light, and a housing that accommodates these. The LiDAR may further include a lens and a cover that protects the lens. In some cases, the transparent cover, the filter, the lens and the like are integrated.

In the first to third embodiments described above, the vehicle air cleaner 1 may be configured to blow air on only one of the rear camera 2 and the back camera 3.

The present application is based on a Japanese Patent Application Publication No. 2017-165446 filed on Aug. 30, 2017, a Japanese Patent Application Publication No. 2017-165448 fled on Aug. 30, 2017, a Japanese Patent Application Publication No. 2017-254182 filed on Dec. 28, 2017, and a Japanese Patent Application Publication No. 2018-051385 filed on Mar. 19, 2018, the contents of which are incorporated herein by reference.

The invention claimed is:

1. A vehicle air cleaner to be attached to a vehicle appearance component having an opening via a rubber seal, the vehicle air cleaner comprising:
   the rubber seal configured to form a waterproofed area with the vehicle appearance component;
   an air blower configured to send out air to be ejected to an object to be cleaned;
   a motor configured to drive the air blower;
   a base frame configured to be attached to the vehicle appearance component via the rubber seal; and
   a waterproof cap configured to be attached to the base frame in a watertight manner,
   wherein the motor is entirely disposed in the area that is waterproofed by the rubber seal and the vehicle appearance component,
   wherein the air blower is disposed in an area that is not waterproofed by the rubber seal and the vehicle appearance component, and
   wherein the motor is provided in a space formed by the base frame and the waterproof cap.

2. The vehicle air cleaner according to claim 1,
wherein the base frame includes an air blowing casing portion that accommodates the air blower and a motor attachment portion to which the motor is attached,
wherein the motor attachment portion is provided in an area that is waterproofed by the rubber seal, the vehicle appearance component and the base frame, and
wherein the air blowing casing portion is provided in an area that is not waterproofed by the rubber seal, the vehicle appearance component and the base frame.

3. The vehicle air cleaner according to claim 1, wherein the rubber seal is provided so as to surround the opening on an outer surface of the vehicle appearance component.

4. The vehicle air cleaner according to claim 1, wherein an air suction port of the air blower opens in a direction other than a direction facing the vehicle appearance component.

* * * * *